United States Patent
Kanai

(10) Patent No.: US 10,006,560 B2
(45) Date of Patent: Jun. 26, 2018

(54) SOLENOID VALVE DRIVE CONTROL DEVICE AND SOLENOID VALVE COMPRISING SOLENOID VALVE DRIVE CONTROL DEVICE

(71) Applicant: Kabushiki Kaisha Saginomiya Seisakusho, Tokyo (JP)

(72) Inventor: Yuji Kanai, Sayama (JP)

(73) Assignee: Kabushiki Kaisha Saginomiya Seisakusho, Tokyo (JP)

( * ) Notice: Subject to any disclaimer, the term of this patent is extended or adjusted under 35 U.S.C. 154(b) by 0 days. days.

(21) Appl. No.: 15/515,726

(22) PCT Filed: Oct. 1, 2015

(86) PCT No.: PCT/JP2015/077974
§ 371 (c)(1),
(2) Date: Mar. 30, 2017

(87) PCT Pub. No.: WO2016/052711
PCT Pub. Date: Apr. 7, 2016

(65) Prior Publication Data
US 2017/0299080 A1    Oct. 19, 2017

(30) Foreign Application Priority Data
Oct. 3, 2014    (JP) .................. 2014-205009

(51) Int. Cl.
*F16K 31/06*    (2006.01)
*H01F 7/18*    (2006.01)
(Continued)

(52) U.S. Cl.
CPC ...... *F16K 31/0655* (2013.01); *F16K 31/0675* (2013.01); *H01F 7/18* (2013.01); *F25B 41/04* (2013.01)

(58) Field of Classification Search
CPC .... H01H 47/04; H01H 47/043; H01F 7/1805; H01F 7/1816; F01L 2009/0401; F16K 31/0675
(Continued)

(56) References Cited

U.S. PATENT DOCUMENTS 4,949,215 A    8/1990    Studtmann et al.
5,632,468 A *  5/1997    Schoenmeyr ....... F16K 31/0675
                                                        137/392
(Continued)

FOREIGN PATENT DOCUMENTS

CN    203215024 U    9/2013
CN    104006203 A    8/2014
(Continued)

OTHER PUBLICATIONS

International Preliminary Report on Patentability issued in corresponding International Application No. PCT/JP2015/077974, dated Apr. 13, 2017, 11 pages.
(Continued)

*Primary Examiner* — Seth W MacKay-Smith
(74) *Attorney, Agent, or Firm* — Snyder, Clark, Lesch & Chung, LLP

(57) ABSTRACT

A solenoid valve drive control device includes a switching device that provides and interrupts the application of the electric current to the solenoid, a first device that controls the application of the electric current to the solenoid by the switching device to start the application of the electric current to the solenoid at zero cross timing in a power supply period, and a second device that detects a value of an electric current that flows to the solenoid. The application of the electric current to the solenoid is interrupted when the detected value of the electric current reaches a predetermined value, after the zero cross timing. A holding power is
(Continued)

generated by discharging energy accumulated in the solenoid through a snubber circuit until another zero cross timing subsequent to the zero cross timing after the application of the electric current to the solenoid is interrupted.

14 Claims, 11 Drawing Sheets

(51) Int. Cl.
 *H01H 47/04* (2006.01)
 *F25B 41/04* (2006.01)
(58) Field of Classification Search
 USPC .............................. 251/129.05; 361/139, 160
 See application file for complete search history.

(56) References Cited

U.S. PATENT DOCUMENTS

| | | | | |
|---|---|---|---|---|
| 6,233,132 B1* | 5/2001 | Jenski | ...................... | H01H 9/56 361/152 |
| 6,317,308 B1* | 11/2001 | Durif | .................. | H01H 47/002 361/143 |
| 6,865,064 B2* | 3/2005 | Miyajima | ............ | G02B 26/085 361/152 |
| 6,903,554 B2* | 6/2005 | Wilson | ............... | G01R 31/3278 324/418 |
| 7,944,671 B2* | 5/2011 | Nishida | ..................... | F01L 9/04 123/90.17 |
| 8,154,841 B2* | 4/2012 | Allen | ....................... | H01H 9/56 361/139 |
| 8,508,905 B2* | 8/2013 | Baek | .................... | H01H 47/325 361/139 |
| 2006/0232907 A1* | 10/2006 | Huber | ................... | F25D 21/008 361/160 |
| 2007/0053133 A1* | 3/2007 | Evans | ................... | H01F 7/1805 361/160 |
| 2012/0099239 A1* | 4/2012 | Sagues | ................. | H01F 7/1805 361/170 |

FOREIGN PATENT DOCUMENTS

JP 2002340221 A 11/2002
JP 3777265 B2 5/2006

OTHER PUBLICATIONS

International Search Report issued in corresponding International Application No. PCT/JP2015/077974, dated Dec. 15, 2015, 9 pages.

* cited by examiner

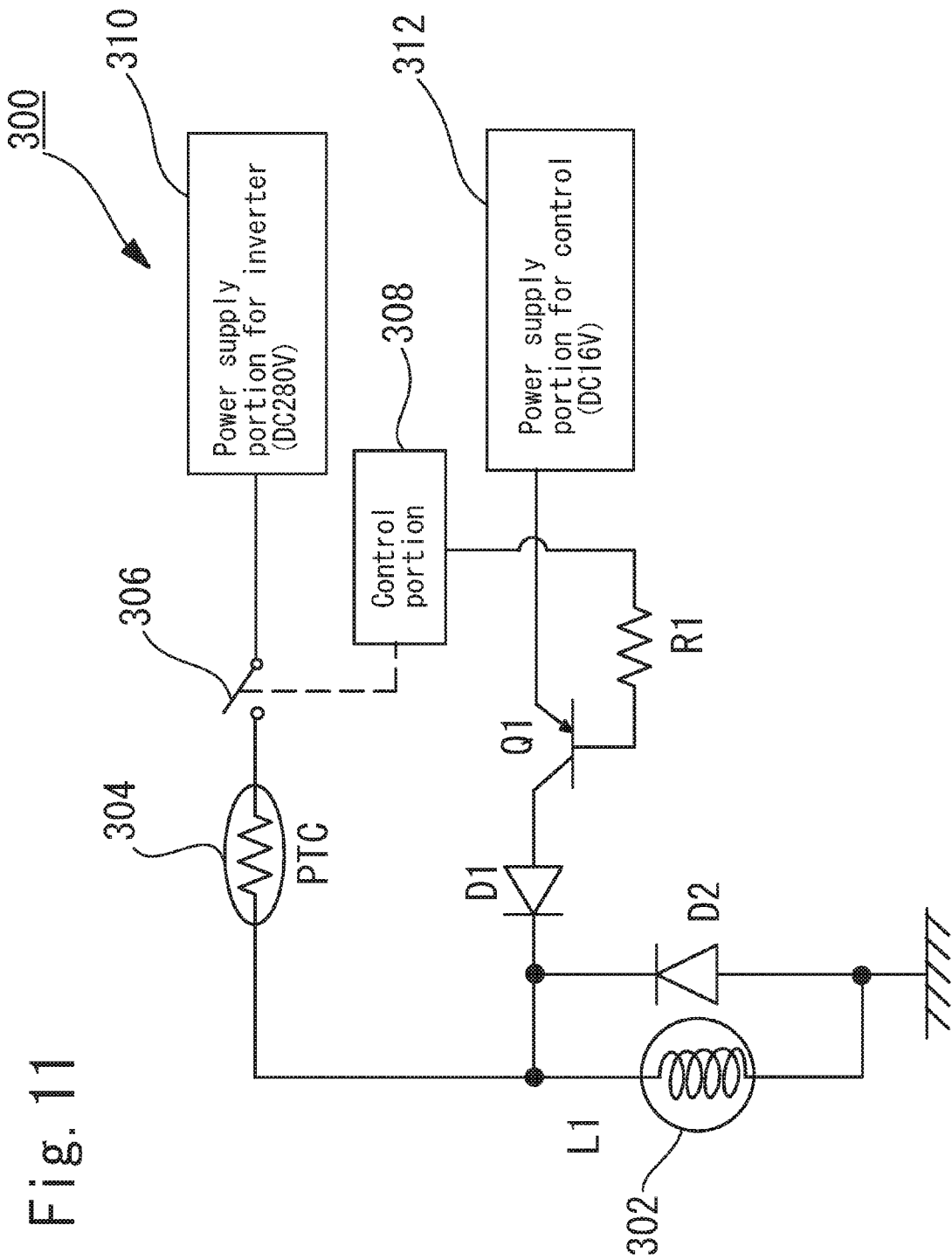

SOLENOID VALVE DRIVE CONTROL DEVICE AND SOLENOID VALVE COMPRISING SOLENOID VALVE DRIVE CONTROL DEVICE

TECHNICAL FIELD

The invention relates to a solenoid valve drive control device.

In more detail, the invention relates to a solenoid valve drive control device and a solenoid valve comprising the solenoid valve drive control device, in which the alternating current from the ac power supply is converted into direct current by using the full-wave rectification, and a plunger is moved by providing the application of this direct current to a solenoid (electromagnetic coil), a valve element installed in the plunger is moved, and attached to and separated from a valve seat, and a valve port formed to the valve seat is opened and closed.

BACKGROUND ART

Conventionally, for instance, a general solenoid valve is composed as shown in FIG. 9.

That is, as shown in FIG. 9, a solenoid valve 100 is provided with a control unit 104 comprising a valve element 102.

Moreover, the control unit 104 of this solenoid valve 100 is provided with an electromagnetic coil 108 to which a driving portion 106 is passed through as shown in FIG. 9.

In addition, the electromagnetic coil 108 is provided with a bobbin 120 where the winding wire is rolled and as to surround the periphery of the bobbin 120, it is molded with a molding resin 112.

In addition, as shown in FIG. 9, the electromagnetic coil 108 is provided in a magnetic frame 114, and fixed to the driving portion 106 by the magnetic frame 114.

That is, the driving portion 106 is passed through to a driving portion inserting through hole 118 formed to the center section of a base plate portion 116 of the magnetic frame 114 and a driving portion inserting through hole 122 of the bobbin 120.

In addition, into a bolt inserting through hole 126 formed to the upper part of an attracting member 124 of the driving portion 106, a fastening bolt 132 is screwed together, through a bolt inserting through hole 130 formed to the center section of an upper plate portion 128 of the magnetic frame 114.

As a result, an electromagnetic coil 108 is passed through to the driving portion 106 and is fixed, so that a control unit 104 of the solenoid valve 100 is composed.

In addition, the driving portion 106 is provided with a plunger casing 134, and a plunger 136 in which the valve element 102 is fixed that can be moved upwardly and downwardly in this plunger casing 134.

In addition, between the attracting member 124 and the plunger 136, the plunger 136 is urged downwardly, that is, an urging spring 140 that urges the valve element 102 in the direction of the valve seat 138 is disposed.

As for such solenoid valve 100, by applying the electric current to the electromagnetic coil 108, the plunger 136 is moved in the directions of the attracting member 124 against the urging spring 140.

As a result, the valve element 102 connected with the plunger 136 is separated from the valve seat 138, so that a valve port 142 is opened.

Moreover, by interrupting the application of the electric current to the electromagnetic coil 108, the plunger 136 is moved in the direction that separates from the attracting member 124 by the urging force of the urging spring 140.

As a result, the valve element 102 connected with the plunger 136 is abutted to a valve seat 138, and the valve port 142 is closed.

Moreover, when the alternating current is applied to the electromagnetic coil 108, the magnetic flux is generated.

Consequently, the plunger 136 is moved in the direction of the attracting member 124 against the urging spring 140.

As a result, the state that the plunger 136 and the attracting member 124 are abutted, that is, the state that the valve element 102 is separated from the valve seat 138 and the valve port 142 is opened is maintained.

Conventionally, for the generation of the eddy current, in an annular groove 146 for the coil installation which is formed to a lower end surface 144 that faces to the plunger 136 of the attracting member 124, an annular shading off coil 148 (shading off ring) is installed.

In this case, the electromagnetic coil 108 which is used to drive the solenoid valve 100, power consumption is different in each power-supply voltage.

Therefore, it is necessary to prepare it by the winding specification such that the temperature rise tolerance limit of electromagnetic coil 108 is not exceeded.

In a word, the plunger 136 can not be attracted only by the generation of the alternating field in the electromagnetic coil 108.

Therefore, the structure that the plunger 136 is attracted upwardly in the direction of the attracting member 124 by embedding the shading off coil 148 in the attracting member 124 (or the plunger 136 side), so that the eddy current is generated, is adopted.

PRIOR ART REFERENCE

Patent Document

[Patent Document 1]
JP 3777265, B
[Patent Document 2]
JP 4911847, B
[Patent Document 3]
JP 2014-105722, A

SUMMARY OF INVENTION

Problems to be Solved by the Invention

By the way, in the conventional solenoid valve 100 composed like this, power-factor worsens by inserting the shading off coil 148.

Moreover, the predetermined attraction is not obtained by the temperature rise of the electromagnetic coil 108 by applying the electric current.

Therefore, it is necessary to roll the winding wire of the electromagnetic coil 108 extra.

As a result, it is a factor that the member and the number of processing are increased, and the cost is increased.

Moreover, in the conventional solenoid valve 100, after the plunger 136 is attracted in the direction of the attracting member 124, it is necessary to keep applying the electric current to electromagnetic coil 108.

As a result, it is a fact to consume useless power.

By the way, in Patent Document 1 (JP 3777265, B), in order to attach the plunger which is integral to the valve element to a core and to do attachment and hold, a solenoid valve that controls electric current thrown to a coil is proposed.

In this solenoid valve, the attraction is improved when the plunger is attached, and the electric current thrown to attachment and hold is made a low current and unnecessary electricity consumption is reduced.

For that purpose, the solenoid valve drive control device 200 of this Patent Document 1, comprising, as shown in the block diagram of FIG. 10, a full-wave rectifier portion 202 that converts the ac power supply into the dc power supply, a power supply smooth portion 204 that takes out the voltage more than the definite value from the power-supply voltage which is made direct current by the full-wave rectifier portion 202 and smoothes it, a comparison operation portion 208 that controls application of the electric current and interruption of the application of the electric current to a solenoid (electromagnetic coil) 206, and a driver element portion 210 to which application of the electric current and interruption of the application of the electric current to the electromagnetic coil 206 are operated by outputting of a comparison operation portion 208.

In addition, it comprises, in order to flow the electric current about twice a minimum holding current necessary to make the core (attracting member) attach to the plunger by them into electromagnetic coil 206, an adsorption electric current indication portion 212 that indicates the electric current application time to the comparison operation portion 208, in order to flow the electric current necessary for the adsorption holding of the plunger and the core to the electromagnetic coil 206 an adsorption holding current indication portion 214, in which instruction of time of applying the electric current and interrupting the application of the electric current to the electromagnetic coil 206 is indicated to the comparison operation portion 208.

That is, by the dc power supply by the full-wave rectifier portion 202, an electric current, which is necessary to make the plunger to be attached to the core, is flowed in the electromagnetic coil 206.

As a result, the plunger is attached to the excited core.

In addition, application of electric current and interruption of the application of the electric current to the electromagnetic coil 206 by a driver element portion 210 are controlled on the basis of the output from the comparison operation portion 208.

As a result, the adsorption holding is performed by the electric current about twice a minimum holding current necessary for being flowed when adsorption is held.

In that case, the electric current application time, for which the electric current necessary for the first adsorption is flowed to the electromagnetic coil 206, is decided by the adsorption electric current indication portion 212.

Moreover, the electric current application and the electric current application interruption time, for which the electric current necessary for the adsorption holding after it is attached are applied and interrupted, is decided by the adsorption holding current instruction portion 214.

As a result, the applied electric current to the electromagnetic coil 206 can be increased to the maximum.

Consequently, when the plunger is attached and is held to the core, the electric current that flows to the electromagnetic coil 206 becomes a low current and unnecessary electricity consumption can be reduced.

However, in the solenoid valve drive control device 200 of Patent Document 1, as shown in the drawing, the shading off coil (shading off ring) is installed in the core (attracting member).

Therefore, power-factor worsens by inserting the shading off coil.

As a result, moreover, the predetermined attraction is not obtained by the temperature rise of the electromagnetic coil by applying the electric current.

Consequently, the winding wire of the electromagnetic coil should be extra rolled, and it becomes a factor that the cost increases.

Moreover, in the solenoid valve drive control device 200 of Patent Document 1, after the plunger is attracted in the direction of the attracting member, a minimum holding current should keep being applied to the electromagnetic coil.

As a result, useless power is consumed.

On the other hand, in Patent Document 2 (JP4911847, B), the air conditioning machine comprising the solenoid valve controller is disclosed.

That is, the solenoid valve controller 300 of Patent Document 2 comprises, as shown in the block diagram of FIG. 11, a positive characteristic temperature coefficient element 304, which is connected with a valve coil 302 of the four-way switching solenoid valve, and a relay 306 as the first switching device, which is connected with the positive characteristic temperature coefficient element 304.

Moreover, a diode D1 in which the cathode is connected with the valve coil 302, and a transistor Q1 as the second switching device in which collector is connected with anode of the diode D1 are provided.

In addition, a control unit 308, in which a control signal is output to the relay 306 and a control signal is output to the base of a transistor Q1 through a resistance R1, is provided.

Moreover, to the other end of relay 306, direct current high voltage (DC280V) from a power unit 310 for the inverter for the inverter circuit where the compressor of the air conditioning machine is driven is applied.

In addition, to the emitter of transistor Q1, direct current low voltage (DC16V) from a power unit 312 for the control of the inverter circuit of the air conditioning machine is applied.

As a result, the relay 306 as the first switching device and the transistor Q1 as the second switching device are switched.

Consequently, direct current high voltage (DC280V) is supplied from the power unit 310 for the inverter to drive the compressor of the air conditioning machine.

Moreover, direct current low voltage (DC16V) is supplied from the power unit 312 for the control of the air conditioning machine.

Therefore, the solenoid valve mechanical power source need not be separately prepared, and the cost can be reduced.

However, as for this construction, the power unit 310 for the inverter to drive the compressor of the air conditioning machine and the power unit 312 for the control of the air conditioning machine are necessary.

Therefore, it can be insistently used for only the air conditioning machine, and it is not possible to use it for other usages generally.

After the plunger is attracted in the direction of the attracting member, a minimum holding current should keep being applied to the electromagnetic coil.

As a result, useless power is consumed.

Therefore, the instant applicant, in Patent Document 3 (JP, 2014-105722, A), in an open valve drive period (A) for opening a valve port formed to the valve seat, after applying direct current high voltage (Va) to the solenoid, it is composed that a direct current low voltage (Vb) is applied for holding period (B) to hold the state of an open valve. Furthermore, when the supply voltage to the solenoid 66 is switched from the open valve drive period (A) to the holding period (B), the voltage is decreased from direct current high voltage (Va) toward direct current low voltage (Vb) in the constant gradient.

In such a way, the solenoid valve drive control device in which the voltage reduction device is provided is proposed.

As a result, the shading off coil (shading off ring) is unnecessary in the attracting member or the plunger.

The winding wire of the solenoid (electromagnetic coil) need not be extra rolled.

As a result, the member and number of processing are decreased, so that the cost can be reduced.

Moreover, after the plunger is attracted in the direction of the attracting member, a minimum holding current should keep being applied to the electromagnetic coil.

However, the electric current is extremely low, and useless power never be consumed.

Moreover, the phenomenon, in which the plunger is disengaged, is not be generated.

As for such a solenoid valve, the coiled body case is enlarged.

Therefore, power that is required for attracting the plunger is also increased.

In addition, when the coiled body case is large, the stray capacity of the coil is increased.

As a result, big inrush current flows to the stray capacity at the superimposed voltage to the coil.

Moreover, when the inrush current is generated, the noise that originates in inrush current is occurred.

It might not be able to meet EMC standard) ((Electromagnetic Compatibility) concerning the EMI measurement of a general standard among related standards.

Therefore, the object of the invention is to provide to a solenoid valve drive control device and a solenoid valve comprising the solenoid valve drive control device, in which it is possible to be used in the alternating-current power supply voltage of the business (Effective voltage: 100 Vac-240 Vac), and in which the generation of the noise that originates in inrush current can be controlled by reducing inrush current to the stray capacity of the coil, and accumulating energy in the coil, and in which the energy conservation can be attained.

Solution to Problem

The invention was invented to attain the problem and the purpose in the above-mentioned prior art, and a solenoid valve drive control device of the invention, in which a plunger is moved by applying the electric current to a solenoid, a valve element installed in the plunger is moved, and attached to and separated from a valve seat, and being entered in the state of an open valve by separating a valve element from the valve seat and attaching to the attracting member when the electric current is applied, the valve element is abutted to the valve seat when the electric current is not applied and being entered in the state of the valve closing, the solenoid valve drive control device comprising, a switching device that provides and interrupts the application of the electric current to the solenoid, a zero cross timing generation device, in which the application of the electric current to the solenoid by the switching device is controlled, so that the application of the electric current is started at zero cross timing in the power supply period, and an electric current sensing device that detects current value that flows to the solenoid, by controlling of the zero cross timing generation device, after the application of the electric current is started at zero cross timing to the solenoid by the switching device, when the current value that flows to the solenoid detected by the electric current sensing device reaches predetermined setting current value Ia, an interruption mode in which the application of the electric current to the solenoid is interrupted by the switching device, after interrupting the application of the electric current to the solenoid by the switching device, the holding power is generated by discharging the energy that accumulated in the solenoid until next zero cross timing through a snubber circuit, and a hold mode in which the current value that flows to the solenoid is set to reach predetermined holding current value Ib or more.

By component like this, applying the electric current to the solenoid by the switching device is controlled by the zero cross timing generation device so that the application of the electric current is started at the zero cross timing in the power supply period.

As a result, inrush current to the stray capacity of the coil can be controlled.

The generation of the noise can be controlled by so-called "Off phase control" by adjusting inrush current to the stray capacity of the coil to zero, and by accumulating energy in the solenoid (electromagnetic coil).

Moreover, when the power-supply voltage is 20V or less, inrush current to the stray capacity of the coil doesn't reach the value that exceeds the limit value of EMC standard, and the energy conservation can be attained.

In addition, in the interruption mode, by controlling of the zero cross timing generation device, after application of the electric current is started at zero cross timing to the solenoid by the switching device, when the current value that flows to the solenoid detected by the electric current sensing device reaches predetermined setting current value Ia, application of the electric current to the solenoid is interrupted by the switching device.

Moreover, in the hold mode, after interrupting application of the electric current to the solenoid by the switching device, the holding power is generated by discharging the energy that accumulated in the solenoid until next zero cross timing through a snubber circuit, the current value that flows to the solenoid is set to reach predetermined holding current value Ib or more.

As a result, the holding power is generated by discharging the energy that accumulated in the solenoid until next zero cross timing through a snubber circuit, the current value that flows to the solenoid is set to reach predetermined holding current value Ib or more.

Therefore, after interrupting application of the electric current to the solenoid, a long holding current more than the power supply period is, for example, is switched the circuit to the snubber circuit that uses the diode.

As a result, electricity is slowly discharged, energy can be held, the plunger can be kept attract to the attracting member in the state of the absorption (state of an open valve). Consequently, the energy conservation can be attained.

Thus, the solenoid valve drive control device, in which it is possible to be used in the alternating-current power supply voltage of the business (Effective voltage: 100 Vac-240 Vac), and in which the generation of the noise that originates in inrush current can be controlled by reducing inrush current to the stray capacity of the coil, and accumulating energy in the coil, and in which the energy conservation can be attained, can be provided.

Moreover, the solenoid valve drive control device of the invention is characterized in that the setting current value is a current value that the plunger is attached to the attracting member after application of the electric current to the solenoid is started at the zero cross timing.

Like this, the setting current value is a current value that the plunger is attached to the attracting member after application of the electric current to the solenoid is started at the zero cross timing.

Therefore, an extra electric current is never applied to the solenoid, so that the energy conservation can be achieved.

Moreover, the solenoid valve driving control device of the invention is characterized in that the holding current value is a current value in which the state that the plunger is attached to the attracting member can be held.

Like this, the holding current value is a current value in which the state that the plunger is attached to the attracting member can be held.

As a result, the plunger can be kept attract to the attracting member in the state of the absorption (state of an open valve).

Therefore, it does not become a state of dropout that plunger is separated from state of adsorption to the attracting member.

Moreover, the solenoid valve driving control device of the invention is characterized in that in the hold mode, a dropout sensing device that detects the dropout in which the plunger is separated from the state of adsorption to the attracting member is provided.

That is, in the solenoid valve drive control device of the invention, as mentioned above, an extra electric current is not flowed in the solenoid (electromagnetic coil).

As a result, for instance, it might drop from the state that the plunger is attached to the attracting member by the cause of the change of some vibrations and pressures etc. (external cause).

It might not be able to absorb again when entering the state of the dropout like this.

As a result, in the hold mode, when the plunger is dropped by any chance, the dropout, in which the plunger is separated from the state of adsorption to the attracting member, is detected by the dropout sensing device.

Consequently, again application of the electric current to the solenoid is started, so that the dropout, in which the plunger is separated from the state of adsorption to the attracting member, can be avoided.

As a result, operation and the reliability is improved.

Moreover, the solenoid valve driving control device of the invention is characterized in that in the dropout sensing device, a current value when application of the electric current to the solenoid is started at the zero cross timing is measured by an electric current sensing device, and whether it is the predetermined dropout detection current value or less is judged and the dropout is detected.

Like this, a current value when application of the electric current to the solenoid is started at the zero cross timing is measured by the electric current sensing device, and whether it is the predetermined dropout detection current value or less is judged and the dropout is detected.

That is, in the state that the plunger is attached to the attracting member, the coil inductance is, for instance, 2.5 H or more.

On the other hand, in the state that the plunger is dropped, the coil inductance is, for instance, 1.5H(Henry) or less.

Therefore, the current value when application of the electric current to the solenoid is started at the zero cross timing is, in the state that the plunger is attached to the attracting member (i.e. high inductance), for instance, 21 mA is exceeded.

On the contrary, in the low inductance in the state that the plunger is dropped, the electric connection begins from 21 mA or less.

Therefore, this as indication (predetermined dropout detection current value), the current value when application of the electric current to the solenoid is started at the zero cross timing is measured by the electric current sensing device.

Consequently, whether it is the predetermined dropout detection current value or less may be judged and the dropout may be detected.

As a result, the dropout, in which the plunger is separated from the state of adsorption to the attracting member by the dropout sensing device, is detected.

Furthermore, application of the electric current to the solenoid is started again, so that the dropout in which the plunger is separated from the state of adsorption to the attracting member can be avoided, and operation and the reliability are improved.

Moreover, in the solenoid valve driving control device of the invention, the dropout sensing device may be included that, the time, from the time when application of the electric current to the solenoid is started at the zero cross timing, to the time when the current value, which flows in the solenoid detected by the electric current sensing device, is reached to the predetermined setting current value Ia, is measured, and whether it is the predetermined dropout detection time is judged and the dropout is detected.

That is, the dropout sensing device may be included that, the time, from the time when application of the electric current to the solenoid 66 is started at the zero cross timing, to the time when the current value, which flows in the solenoid 66 detected by the electric current sensing device 78 is reached to the predetermined setting current value Ia, is measured, and whether it is the predetermined dropout detection time is judged and the dropout is detected (for instance, t3 for 1.3H is measured and judged in FIG. 7).

Moreover, as shown in FIG. 7, in the state that the plunger 46 is attached to the attracting member 34, the coil inductance is, for instance, 2.5 H or more.

On the other hand, in the state that the plunger 46 is dropped, the coil inductance is, for instance, 1.5 H or less.

Therefore, the current value when application of the electric current to solenoid 66 begins at zero cross timing will exceed 21 mA for instance in the state that the plunger attaches to the attracting member (high inductance, for instance, in case of 2.5H in FIG. 7).

On the contrary, the electric connection will begin from 21 mA or less in the state that plunger 46 drops (i.e. in case of 1.3 H in the low inductance, for instance, FIG. 7).

Moreover, as described above, in the interruption mode, at the time when the current value, which flows in the solenoid 66 detected by the electric current sensing device 78 is reached to the predetermined setting current value Ia, the application of the electric current to the solenoid 66 is interrupted by the switching device 68.

Therefore, as shown in FIG. 7, time t2 is a time, which required from the time when application of the electric current is interrupted from the state that the plunger 46 is attached to the attracting member 34 (i.e. high inductance, for instance, in case of 2.5H in FIG. 7), to the time to the setting current value Ia.

In addition, time t1 is a time, which required from the time when application of the electric current is interrupted from the state that the plunger is dropped (i.e. low inductance, for instance, in case of 1.3H in FIG. 7). to the setting current value Ia.

Between the time t2 and the time t1, by the influence of the electromagnetic coil at charge time, in the state that the plunger 46 is dropped (i.e. low inductance), the electric current application time required for this charge is shortened compared with the state that the plunger 46 is attached to the attracting member 34 (i.e. high inductance).

As shown in FIG. 7, by measuring this time difference (t2−t1), whether dropping of plunger 46 is occurred or not can be determined.

That is, the time, from the time when application of the electric current to solenoid 66 is started at the zero cross timing, to the time when the current value, which flows in the solenoid 66 detected by the electric current sensing device 78 is reached to the predetermined setting current value Ia, is measured.

Consequently, whether it is the predetermined dropout detection time or less is judged and the dropout is detected.

As a result, the dropout, in which the plunger is separated from the state of adsorption to the attracting member, is detected by the dropout sensing device.

Consequently, again application of the electric current to the solenoid is started, so that the dropout, in which the plunger is separated from the state of adsorption to the attracting member, can be avoided.

As a result, operation and the reliability is improved.

Moreover, the solenoid valve driving control device of the invention is characterized in that, a circuit protection device, wherein after initial electric current application time in which application of the electric current to the solenoid is firstly started at zero cross timing, when the current value that flows to the solenoid detected by the electric current sensing device reaches predetermined setting current value Ic, application of the electric current to the solenoid is interrupted by the switching device, is provided.

That is, in the state that the plunger is at first away from the attracting member (i.e. state of no absorption), the small inductance (for instance, 0.2H) is revealed because the magnetic circuit is not made.

On the other hand, in the state that the plunger is attached to the attracting member, the magnetic circuit is formed in the solenoid, and inductance is increased (for instance, 2.5H).

Therefore, it flows first only by resistance because there is resistance in the coil winding (i.e. coil direct current resistance 230Ω).

That is, the electric current of 1 A flows for instance if it is 200V.

However, for instance, as for the switching device such as MOSFET (Metal Oxide Semiconductor Field Effect Transistor), for instance, in case that the one, in which only about 0.5 A can be flowed, is used, there is a possibility that the circuit breaks.

Therefore, if entering the state that it flows more than the predetermined circuit protection current value (0.5 A for instance), application of the electric current is interrupted and the circuit is safeguarded.

Thus, at the time of an initial application of the electric current, the inductance of the solenoid (i.e. electromagnetic coil) is small, so that heavy-current is flowed.

As a result, the current interruption security function for the circuit protection may be provided.

Like this, after initial electric current application time in which application of the electric current to the solenoid is firstly started at zero cross timing, when the current value that flows to the solenoid detected by the electric current sensing device reaches predetermined setting current value Ic, application of the electric current to the solenoid is interrupted by the switching device, is provided.

As a result, the circuit can be effectively safeguarded.

Moreover, the solenoid valve of the invention comprises the solenoid valve driving control device described above.

Advantageous Effects of Invention

According to the invention, application of the electric current to the solenoid by the switching device is controlled by the zero cross timing generation device so that application of the electric current is started at the zero cross timing in the power supply period.

As a result, inrush current to the stray capacity of the coil can be controlled.

The generation of the noise can be controlled by so-called "Off phase control" by adjusting inrush current to the stray capacity of the coil to zero, and by accumulating energy in the solenoid (i.e. electromagnetic coil).

Moreover, when the power-supply voltage is 20V or less, inrush current to the stray capacity of the coil doesn't reach the value that exceeds the limit value of EMC standard, and the energy conservation can be attained.

In addition, in the interruption mode, by controlling of the zero cross timing generation device, after application of the electric current to the solenoid is started at zero cross timing to the solenoid by the switching device, when the current value that flows to the solenoid detected by the electric current sensing device reaches predetermined setting current value Ia, application of the electric current to the solenoid is interrupted by the switching device.

Moreover, in the hold mode, after interrupting application of the electric current to the solenoid by the switching device, the holding power is generated by discharging the energy that accumulated in the solenoid until next zero cross timing through a snubber circuit, the current value that flows to the solenoid is set to reach predetermined holding current value Ib or more.

As a result, the holding power is generated by discharging the energy that accumulated in the solenoid through a snubber circuit until next zero cross timing, the current value that flows to the solenoid is set to reach predetermined holding current value Ib or more.

Therefore, after interrupting application of the electric current to the solenoid, a long holding current more than the power supply period is, for example, is switched the circuit to the snubber circuit that uses the diode.

As a result, electricity is slowly discharged, energy can be held, the plunger can be kept attract to the attracting member in the state of the absorption (state of an open valve).

Consequently, the energy conservation can be attained.

Thus, the solenoid valve drive control device, in which it is possible to be used in the alternating-current power supply voltage of the business (Effective voltage: 100 Vac-240 Vac), and in which the generation of the noise that originates in inrush current can be controlled by reducing inrush current to the stray capacity of the coil, and accumulating energy in the coil, and in which the energy conservation can be attained, can be provided.

BRIEF DESCRIPTION OF DRAWINGS

FIG. 11 is a block diagram of conventional solenoid valve controller 300.

DESCRIPTION OF EMBODIMENTS

Figure 1:
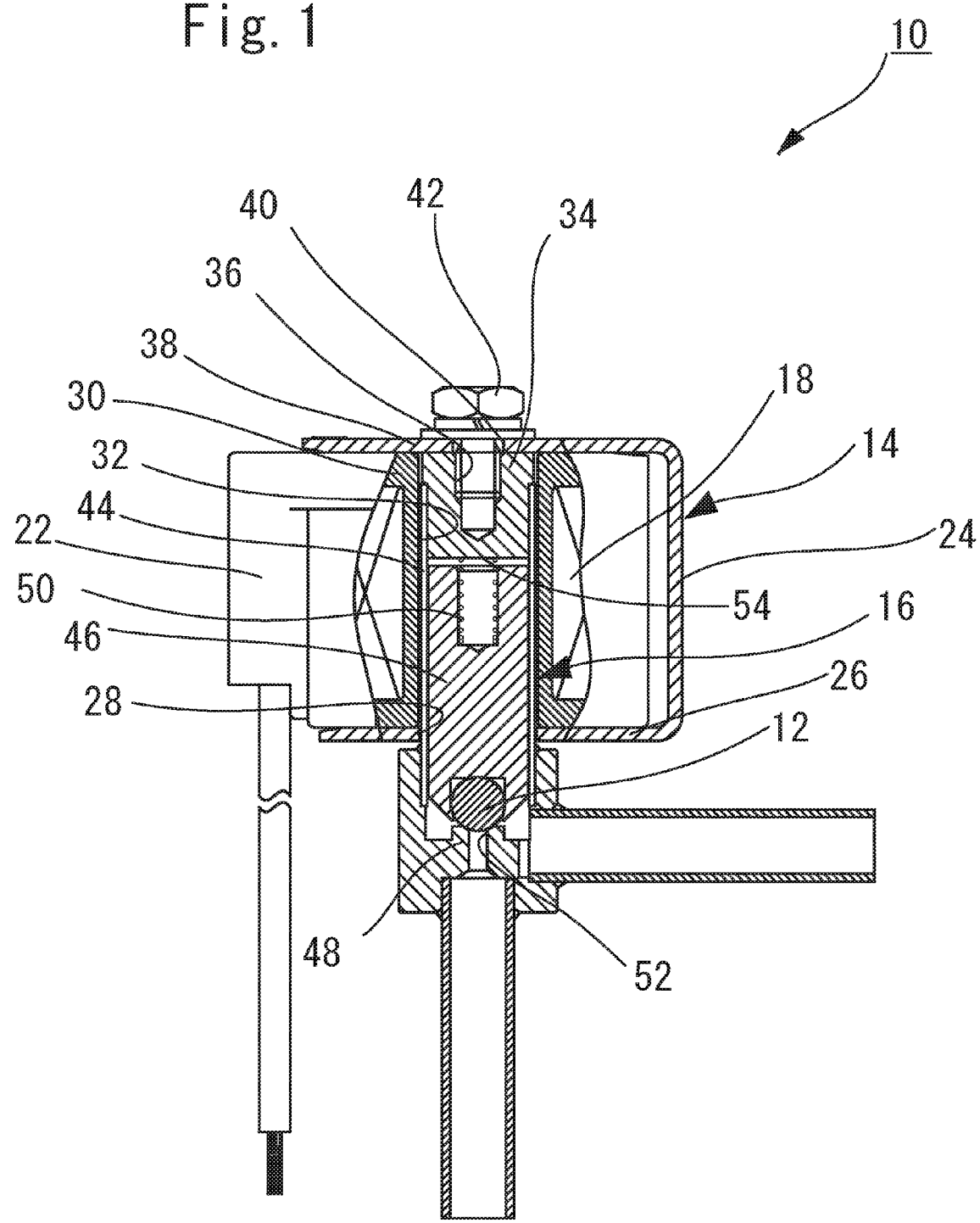
FIG. 1 is a longitudinal sectional view of the solenoid valve that applies the solenoid valve driving control device of the invention.

Hereafter, the embodiment of the invention (Embodiment) is described in the detail or more on the basis of the drawing.

Embodiment 1

FIG. 1 is a longitudinal sectional view of the solenoid valve that applies the solenoid valve driving control device of the invention.

Figure 2:
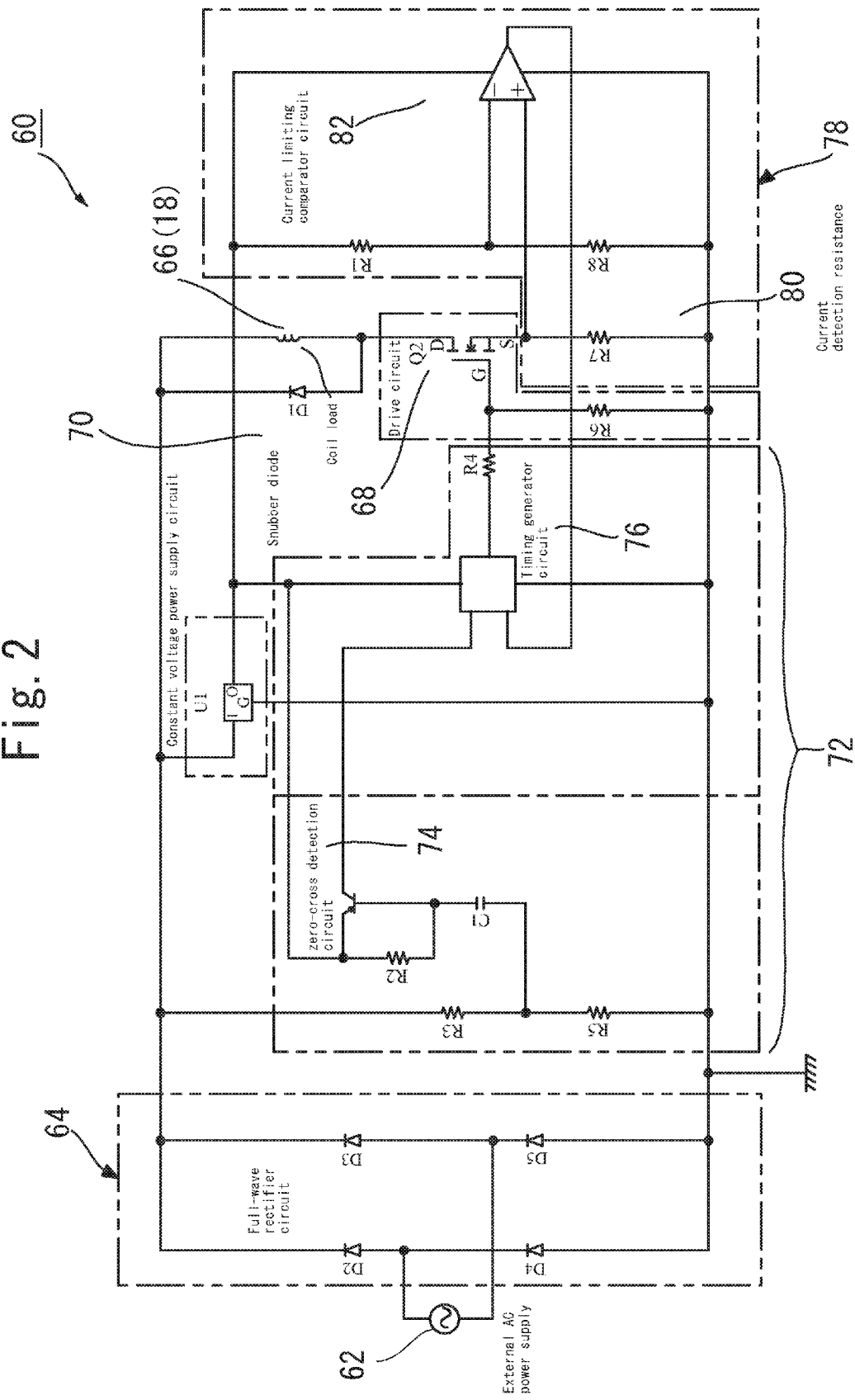
FIG. 2 is a circuit diagram of the solenoid valve driving control device of the invention.

FIG. 2 is a circuit diagram of the solenoid valve driving control device of the invention.

Figure 3:
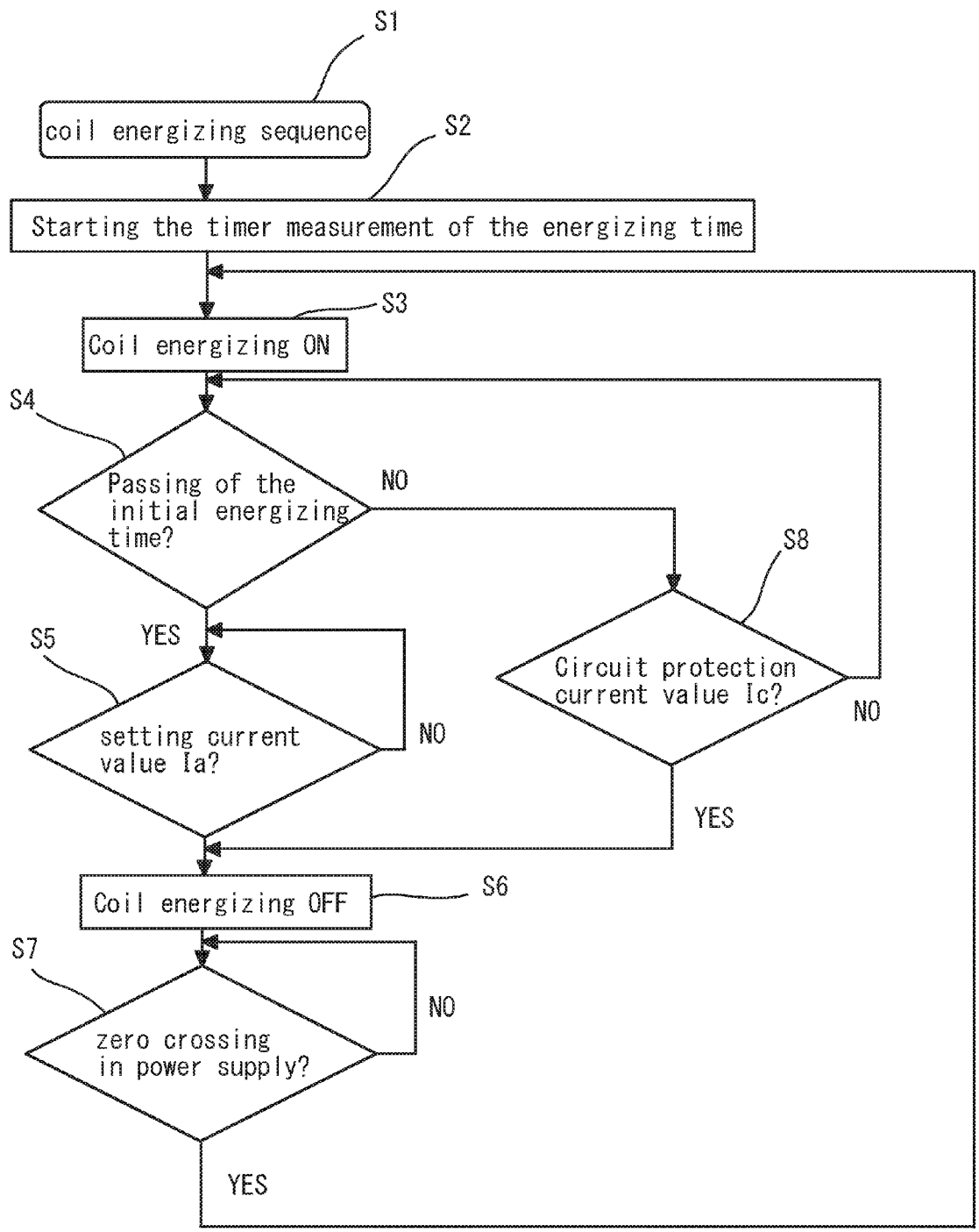
FIG. 3 is a flowchart that shows the control of the solenoid valve driving control device of the invention.

FIG. 3 is a flowchart that shows the control of the solenoid valve driving control device of the invention.

Figure 4:
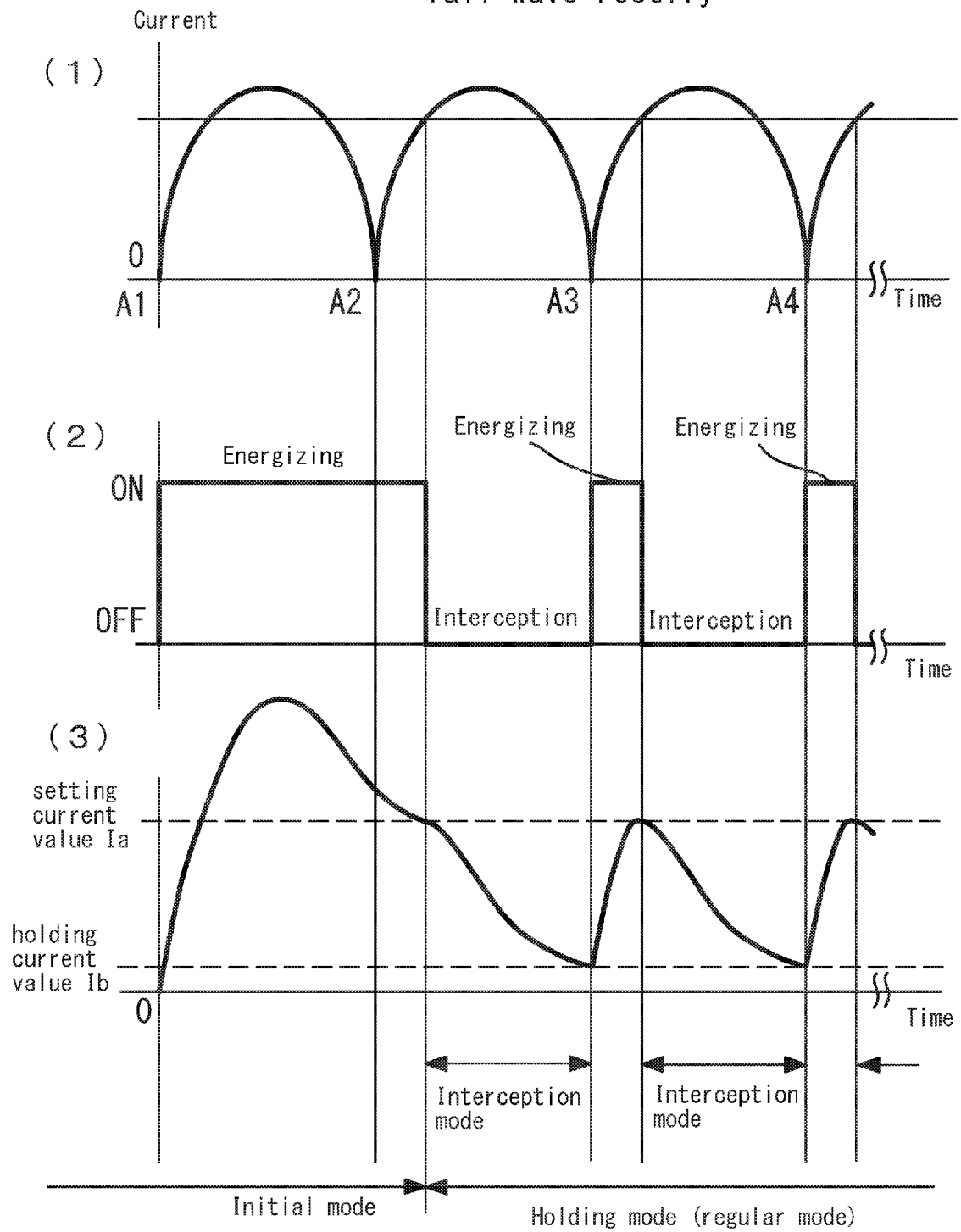
FIG. 4 is a schematic view that shows the control of the solenoid valve driving control device of the invention.

FIG. 4 is a schematic view that shows the control of the solenoid valve driving control device of the invention.

Figure 5:
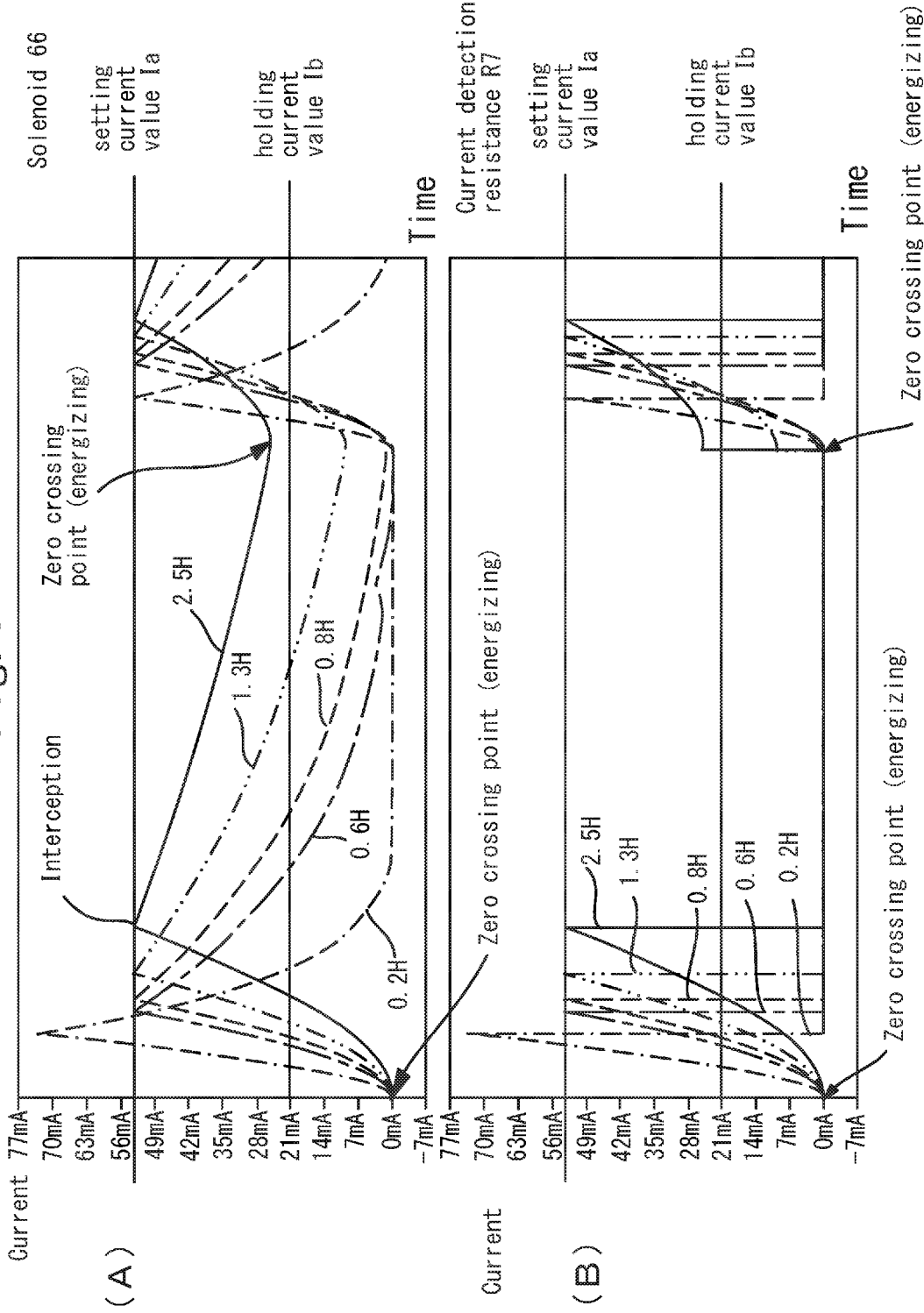
FIG. 5 is a graph where the relation between time and the electric current that shows the state of the hold mode of the solenoid valve driving control device of the invention is shown.

FIG. 5 is a graph where the relation between time and the electric current that shows the state of the hold mode of the solenoid valve driving control device of the invention is shown.

In FIG. 1, the reference numeral 10 shows the solenoid valve that applies the solenoid valve driving control device of the invention as a whole.

As shown in FIG. 1, a solenoid valve 10 is provided with a control unit 14 comprising a valve element 12.

Moreover, the control unit 14 of this solenoid valve 10 is provided with an electromagnetic coil 18 to which a driving portion 16 is passed through as shown in FIG. 1.

In addition, the electromagnetic coil 18 is provided with a bobbin 30 where the winding wire is rolled and as to surround the periphery of the bobbin 30, it is molded with a molding resin 22.

In addition, as shown in FIG. 1, the electromagnetic coil 18 is provided in a magnetic frame 24, and fixed to the driving portion 16 by the magnetic frame 24.

That is, the driving portion 16 is passed through to a driving portion inserting through hole 28 formed to the center section of a base plate portion 26 of the magnetic frame 24 and a driving portion inserting through hole 32 of the bobbin 30.

In addition, into a bolt inserting through hole 36 formed to the upper part of an attracting member 34 of the driving portion 16, a fastening bolt 42 is screwed together, through a bolt inserting through hole 40 formed to the center section of an upper plate portion 38 of the magnetic frame 24.

As a result, an electromagnetic coil 18 is passed through to the driving portion 16 and is fixed, so that a control unit 14 of the solenoid valve 10 is composed.

In addition, the driving portion 16 is provided with a plunger casing 44, and a plunger 46 in which the valve element 12 is fixed that can be moved upwardly and downwardly in this plunger casing 44.

In addition, between the attracting member 34 and the plunger 46, the plunger 46 is urged downwardly, that is, an urging spring 50 that urges the valve element 12 in the direction of the valve seat 48 is disposed.

As for such solenoid valve 10, by applying the electric current to the electromagnetic coil 18, the plunger 46 is moved in the directions of the attracting member 34 against the urging spring 50.

As a result, the valve element 12 connected with the plunger 46 is separated from the valve seat 48, so that a valve port 52 is opened.

Moreover, by interrupting application of the electric current to the electromagnetic coil 18, the plunger 46 is moved in the direction that separates from the attracting member 34 by the urging force of the urging spring 50.

As a result, the valve element 12 connected with the plunger 46 is abutted to a valve seat 48, and the valve port 52 is closed.

Figure 9:
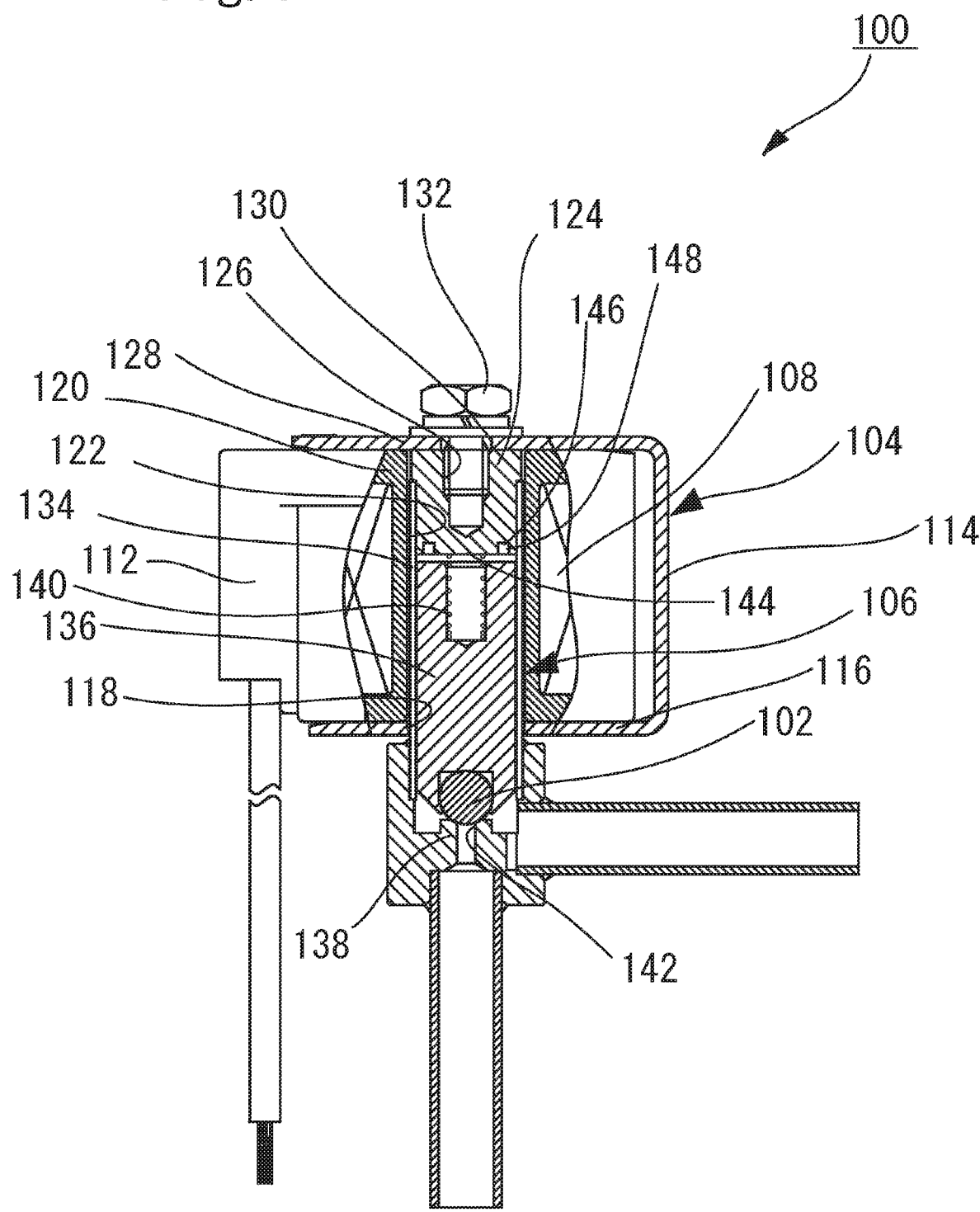
FIG. 9 is a longitudinal sectional view of conventional solenoid valve.

In addition, in the conventional solenoid valve 100 shown in FIG. 9, the annular shading off coil 148 (shading off ring) is provided in the attracting member 124.

However, as shown in FIG. 1, in the solenoid valve 10 that applies the solenoid valve drive control device of the invention, in the attracting member 34 or plunge 46, it is the structure that such a shading off coil (shading off ring) is not provided.

FIG. 2 is a circuit diagram of the solenoid valve driving control device 60 of the invention.

In this Embodiment, the Embodiment that controls the drive of solenoid valve 10 having such component is shown by using the ac power supply as one embodiment.

In addition, the solenoid valve drive control device 60 of the invention can be used in ac power supply and dc power supply (pulsating current).

In case of the dc power supply, the full-wave rectifier 64 described later may be omitted.

The invention is characterized in that charging current in the stray capacity of the coil is not generated.

Therefore, for instance, in the predetermined voltage of 0V-20V or less, it is available that even if it is a dc power supply (for instance, rectangular wave and triangular wave) with the crossing timing.

The solenoid valve drive control device 60 of this Embodiment, for instance, effective voltage of the business: ac power supply 62 consisting of the monophase current power supply of 100V-240V is provided.

In the alternating current from ac power supply 62, by a full-wave rectifier 64 including the diode bridge, the full-wave rectification is performed.

As a result, the direct current is generated.

In addition, as shown in FIG. 2, the alternating current from this full-wave rectifier 64 is applied to a solenoid 66 of the solenoid valve 10 (the electromagnetic coil 18).

As a result, the solenoid 66 is driven.

Consequently, the plunger 46 is moved in the directions of the attracting member 34 against an urging spring 50.

As a result, the valve element 12 connected with the plunger 46 is separated from a valve seat 48, so that a valve port 52 is opened.

In this case, like this, the full wave is rectified with the full-wave rectifier 64, and it is converted into direct current.

As a result, in the solenoid valve 10, the shading off coil need not be provided to the attracting member 34 or plunger 46.

Therefore, even if it is the same magnetic flux necessary to absorb the plunger 46, by omitting the shading off coil, the winding wire of the electromagnetic coil 18 of the solenoid 66 need not be extra rolled.

As a result, the member and the processing man-hour can be reduced and the cost can be decreased.

Moreover, even if it is the same magnetic flux necessary to absorb plunger 46, by omitting the shading off coil, the magneto-resistance of the plunger 46 is decreased, and it approaches the DC drive.

As a result, the deceptive inductance becomes small.

Consequently, the size of the coil of the electromagnetic coil 18 can be lowered.

Moreover, in the solenoid valve drive control device 60 of this Embodiment, as shown in FIG. 2, the electric current, in which the full wave is rectified by the full-wave rectifier 64, is connected to one end of the solenoid 66 of the solenoid valve 10 as a plus side power supply.

Moreover, to the other end of the solenoid 66 of the solenoid valve 10, for instance, a switching means 68 such as MOSFET that provides and interrupts application of the electric current to the solenoid 66, is connected.

In addition, in the solenoid 66 of the solenoid valve 10, as an electric current return current member that returns to the solenoid 66 when application of the electric current is interrupted, for instance, a snubber circuit 70 that uses the diode is connected.

By component like this, for instance, by using the flywheel diode as an electric current return current member, for the period when application of the electric current to solenoid 66 is interrupted, an electric current can be passed thorough the solenoid 66 (i.e. electromagnetic coil 18).

As a result, the plunger can never vibrate, electricity can be discharged slowly, and energy can be held.

Moreover, in the solenoid valve drive control device 60, as shown in FIG. 2, as described later, a zero cross timing generation device 72, in which application of the electric current to the solenoid 66 by the switching device 68 is controlled, so that application of the electric current is started at zero cross timing in the power supply period of the monophase current power supply, is provided.

That is, as shown specifically in FIG. 2, this zero cross timing generation device 72 includes, a zero cross detection circuit 74 to detect zero crosses of the monophase current power supply at the power supply period, a timing generation circuit 76 that controls application of the electric current and interruption of application of the electric current to the solenoid 66 by the switching means 68.

This zero cross detection circuit 74 can use well-known zero cross detection circuit 74 besides the circuit shown in FIG. 2.

Moreover, the solenoid valve drive control device 60, as shown in FIG. 2, includes, an electric current sensing device 78, in which the current value that flows to the solenoid 66 is detected.

That is, as shown specifically in FIG. 2, this electric current sensing device 78 includes, a current detection resistance 80 (R7) in which current value that flows to solenoid 66 is detected, and an electric current limit comparator circuit 82 including comparator to detect predetermined setting current value Ia and predetermined holding current value Ib as described later.

In the solenoid valve drive control device 60 component like this, it is controlled as shown in the flow chart shown in FIG. 3.

First of all, the initial mode is started as shown in FIG. 3 and FIG. 4.

That is, as shown in FIG. 3, the sequence of electric current application to the coil is started in step S1.

The timer measurement of the electric current application time is started in step S2.

In addition, as shown in FIG. 3, in step S3, application of the electric current to the coil is started.

That is, as shown in FIG. 3 and FIG. 4, in the zero cross detection circuit 74 of the zero cross timing generation device 72, the zero cross of the monophase current power supply at the power supply period is detected.

By the timing generation circuit 76, as for application of the electric current to the solenoid 66 by the switching device 68, application of the electric current is started at the zero cross timing in the monophase current power supply at the power supply period (see A1-A3 of FIG. 4).

Next, in step S4 as shown in FIG. 3, it is judged whether the predetermined initial electric current application time is passed.

Specifically, at first, as for whether it passed for within one second though it was the maximum (predetermined time) or not, according to the noise standard (within one second), for instance, it is judged whether the time of 40 msec is passed.

In addition, in step S4, when it is judged that the predetermined initial electric current application time is passed, it proceeds to step S5.

In step S5, as for the current value that flows to solenoid 66 detected by the electric current sensing device 78, it is judged whether it is reached to the predetermined setting current value Ia (see FIG. 4).

That is, this setting current value Ia is a current value that the plunger 46 is attached to the attracting member 34 after application of the electric current to the solenoid 66 is started at the zero cross timing.

For instance, it is set to 55 mA as shown in FIG. 5.

Like this, the setting current value Ia is a current value that the plunger 46 is attached to the attracting member 34 after application of the electric current to the solenoid 66 is started at the zero cross timing.

Therefore, an extra electric current is never applied to the solenoid, so that the energy conservation can be achieved.

In addition, in FIG. 2, in step S5, at the time, i.e. when the current value, which is flowed in the solenoid 66, is reached to the predetermined setting current value Ia, in step S6, it moves to the interruption mode, in which application of the electric current to the solenoid 66 is interrupted by the switching device 68 (see the solid line of FIG. 4 and FIG. 5).

On the other hand, in step S5, when it is judged that the current value, which is flowed in the solenoid 66, is not reached to the predetermined setting current value Ia, it returns to step S5 again.

In step S5, it is judged whether the current value detected by the electric current sensing device 78, which is flowed in the solenoid 66, is reached to the predetermined setting current value Ia.

In addition, in step S6, it moves to the interruption mode, in which application of the electric current to the solenoid 66 is interrupted by the switching device 68.

Thereafter, in step S7, it is judged whether it is a zero cross of the monophase current power supply at the power supply period.

That is, as shown in FIG. 4, in step S7, in zero cross detection circuit 74 of the zero cross timing generation device 72, the zero cross of the monophase current power supply at the power supply period is detected.

As a result, when it is judged that it is a zero cross of the monophase current power supply at the power supply period, it returns to step S3.

In step S3, by the timing generation circuit 76, application of the electric current to the solenoid 66 by the switching device 68 is controlled, so that application of the electric current is started at zero cross timing in the power supply period of the monophase current power supply (see the solid line of FIG. 4 and FIG. 5).

On the other hand, in step S7, when it is judged that it is not a zero cross of the monophase current power supply at the power supply period, it returns to step S7 again.

In step S7, it is judged whether it is a zero cross of the monophase current power supply at the power supply period.

Hereafter, step S3-step S7 is repeated.

Furthermore, it moves to the hold mode (stationary mode) as shown in FIG. 4.

In this case, as shown in FIG. 4, after interrupting application of the electric current to the solenoid 66 by the switching device 68 until next zero cross timing, the energy that is accumulated in the solenoid 66 through the snubber circuit 70 is discharged.

As a result, the holding power is generated, and the hold mode, in which the current value that is flowed in the solenoid 66 is set to be reached to the predetermined holding current value Ib or more, is sustained.

That is, the holding current value Ib is a current value in which the state that the plunger 46 is attached to the attracting member 34 can be held.

For instance, it is set to 21 mA as shown in FIG. 5.

Like this, the holding current value Ib is a current value in which the state that the plunger 46 is attached to the attracting member 34 can be held.

As a result, the plunger 46 can be kept attract to the attracting member 34 in the state of the absorption (state of an open valve).

Therefore, it does not become a state of dropout that plunger 46 is separated from state of adsorption to the attracting member 34.

Moreover, the solenoid valve driving control device 60 of the invention includes, a circuit protection device, wherein after initial electric current application time in which application of the electric current to the solenoid 66 is firstly started at zero cross timing, when the current value that flows to the solenoid 66 detected by the electric current sensing device 8 reaches predetermined setting current value Ic, application of the electric current to the solenoid 66 is interrupted by the switching device 68, is provided.

That is, in step S4 in FIG. 3, where it is judged that the predetermined initial electric current application time is not passed, in step S8, it is judged that whether the current value that flows to the solenoid 66 detected by the electric current sensing device 78 reaches the predetermined setting current value Ic.

In addition, in step S8, in case that it is judged that the current value that flows to the solenoid 66 detected by the electric current sensing device 78 reaches the predetermined setting current value Ic, in step S6, it moves to the interruption mode in which application of the electric current to the solenoid 66 is interrupted by the switching device 68.

On the other hand, in step S8, in case that it is judged that the current value that flows to the solenoid 66 detected by the electric current sensing device 78 is not reached to the predetermined setting current value Ic, it returns to step S4, and it is judged whether the predetermined initial electric current application time is passed.

That is, in the state that the plunger 46 is at first away from the attracting member 34 (i.e. state of no absorption), the small inductance (for instance, 0.2H) is revealed because the magnetic circuit is not made.

On the other hand, in the state that the plunger 46 is attached to the attracting member 34, the magnetic circuit is formed in the solenoid 66, and inductance is increased (for instance, 2.5H).

Therefore, it flows first only by resistance because there is resistance in the coil winding (i.e. coil direct current resistance 200Ω).

That is, the electric current of 1 A flows for instance if it is 200V.

However, for instance, as for the switching device 68 such as MOSFET (Metal Oxide Semiconductor Field Effect Transistor), for instance, in case that the one, in which only about 0.5 A can be flowed, is used, there is a possibility that the circuit breaks.

Therefore, if entering the state that it flows more than the predetermined circuit protection current value (0.5 A for instance), application of the electric current is interrupted and the circuit is safeguarded.

Thus, at the time of an initial application of the electric current, the inductance of electromagnetic coil of the solenoid 66 is small, so that heavy-current is flowed.

As a result, the current interruption security function for the circuit protection may be provided.

Like this, after initial electric current application time in which application of the electric current to the solenoid 66 is firstly started at zero cross timing, when the current value that flows to the solenoid 66 detected by the electric current sensing device 78 reaches predetermined setting current value Ic, application of the electric current to the solenoid 66 is interrupted by the switching device 68, is provided.

As a result, the circuit can be effectively safeguarded.

In the solenoid valve drive control device 60 of the invention component like this, by the zero cross timing generation device 72, application of the electric current to the solenoid 66 by the switching device 68 is controlled, so that application of the electric current is started at zero cross timing in the power supply period of the monophase current power supply.

As a result, inrush current to the stray capacity of the coil can be controlled.

The generation of the noise can be controlled by so-called "Off phase control" by adjusting inrush current to the stray capacity of the coil to zero, and by accumulating energy in the electromagnetic coil 18 of the solenoid 66.

Moreover, when the power-supply voltage is 20V or less, inrush current to the stray capacity of the coil doesn't reach the value that exceeds the limit value of EMC standard, and the energy conservation can be attained.

In addition, in the interruption mode, by controlling of the zero cross timing generation device 72, after application of the electric current to the solenoid 66 is started at zero cross timing by the switching device 68, when the current value that flows to the solenoid detected by the electric current sensing device reaches predetermined setting current value Ia, application of the electric current to the solenoid 66 is interrupted by the switching device 68.

Moreover, in the hold mode, after interrupting application of the electric current to the solenoid 66 by the switching device 68, the holding power is generated by discharging the energy that accumulated in the solenoid 66 until next zero cross timing through a snubber circuit 70, the current value that flows to the solenoid 66 is set to reach predetermined holding current value Ib or more.

As a result, the holding power is generated by discharging the energy that accumulated in the solenoid 66 until next zero cross timing through a snubber circuit 70, the current value that flows to the solenoid 66 is set to reach predetermined holding current value Ib or more.

Therefore, after interrupting application of the electric current to the solenoid 66, a long holding current more than the power supply period is, for example, is switched the circuit to the snubber circuit that uses the diode.

As a result, electricity is slowly discharged, energy can be held, the plunger 46 can be kept attract to the attracting member 34 in the state of the absorption (state of an open valve).

Consequently, the energy conservation can be attained.

Thus, the solenoid valve drive control device 60, in which it is possible to be used in the alternating-current power supply voltage of the business (Effective voltage: 100 Vac-240 Vac), and in which the generation of the noise that originates in inrush current can be controlled by reducing inrush current to the stray capacity of the coil, and accumulating energy in the coil, and in which the energy conservation can be attained, can be provided.

Embodiment 2

Figure 6:
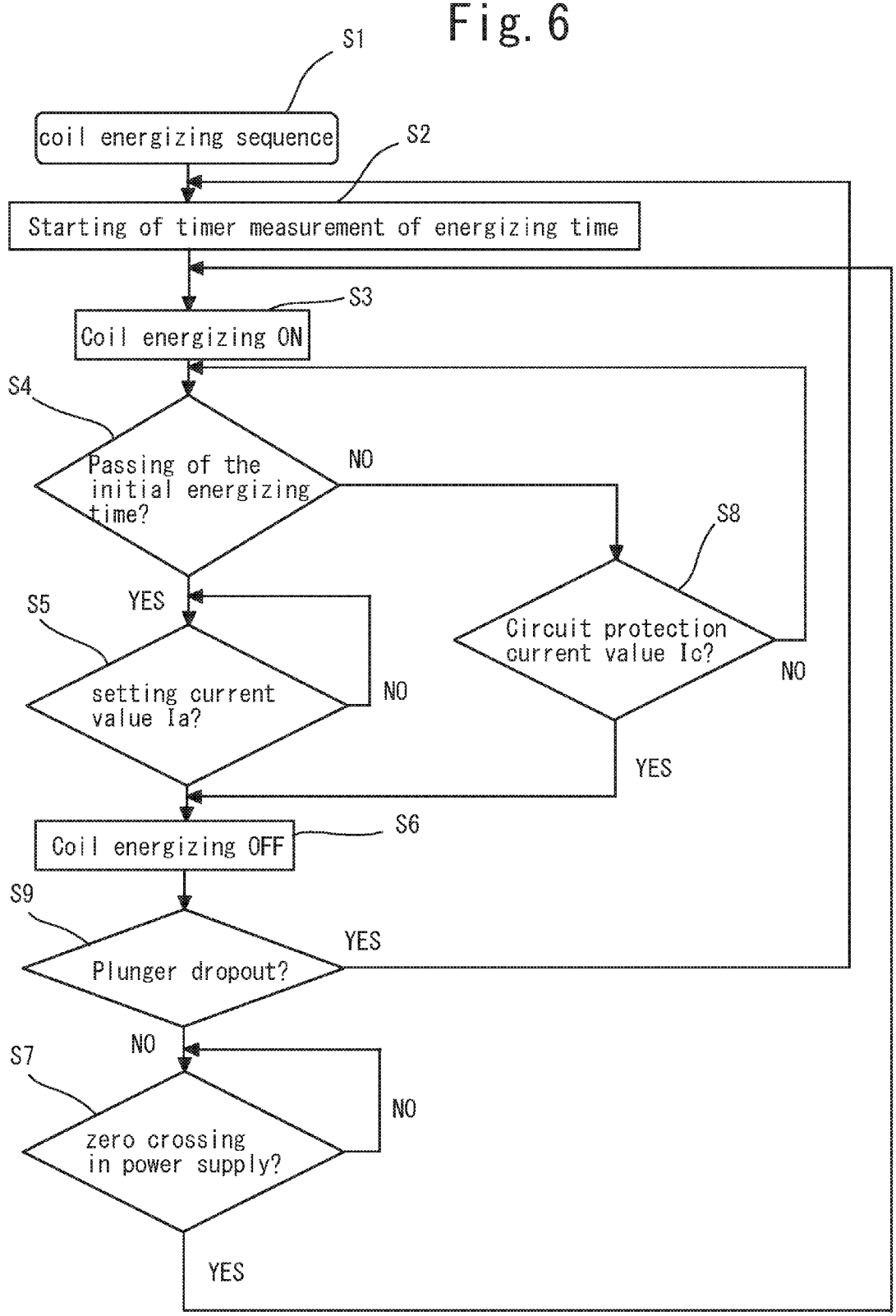
FIG. 6 is a flowchart that shows the control of the solenoid valve driving control device of another Embodiment of the invention.

FIG. 6 is a flow chart that shows the control of the solenoid valve driving control device of another Embodiment of the invention.

Figure 7:
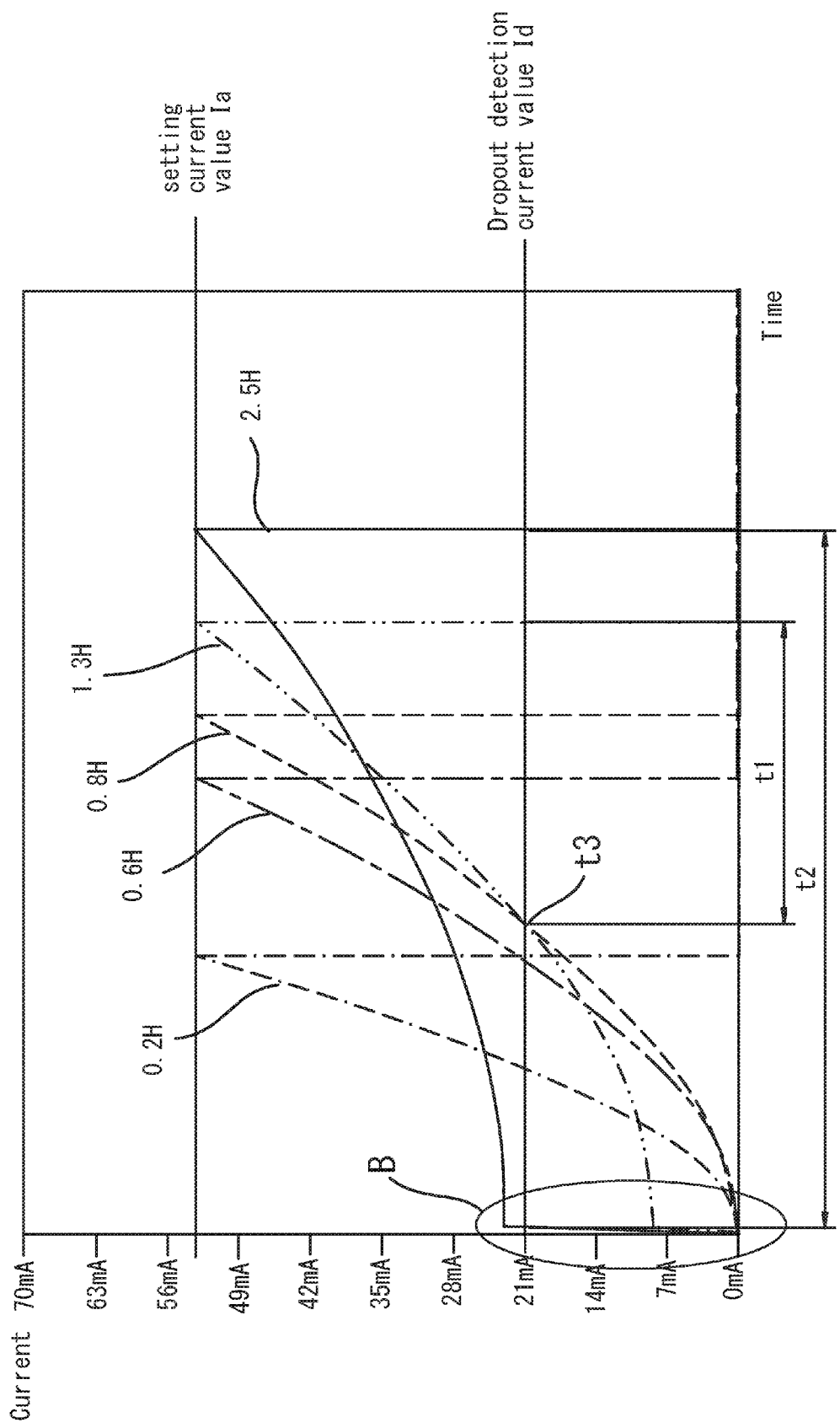
FIG. 7 is a graph where the relation between time and the electric current that shows the control of the solenoid valve driving control device of FIG. 6 is shown.

FIG. 7 is a graph where the relation between time and the electric current that shows the control of the solenoid valve driving control device of FIG. 6 is shown.

Figure 8:
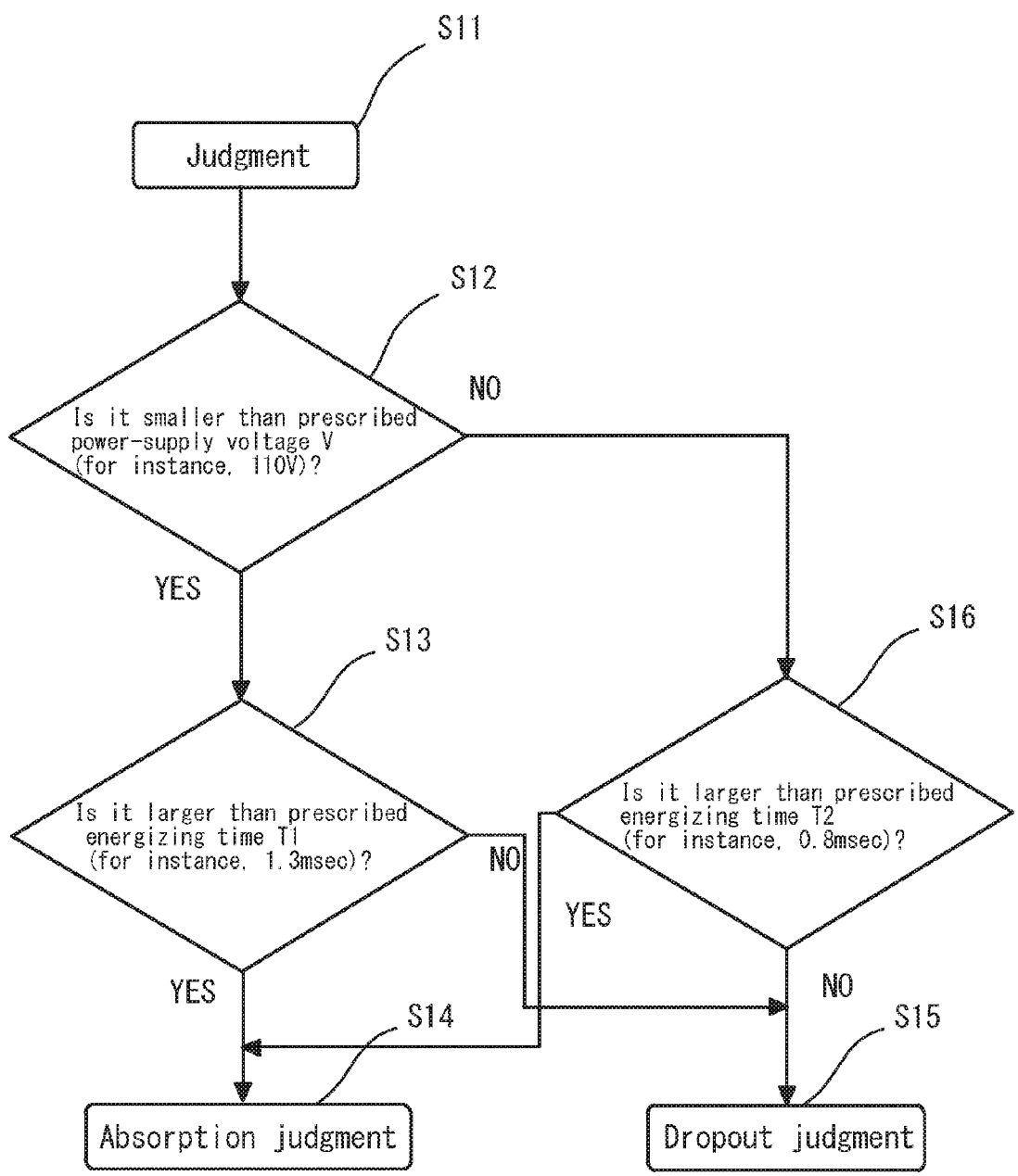
FIG. 8 is a flowchart that shows the control of the solenoid valve driving control device of FIG. 6.

FIG. 8 is a flowchart that shows the control of the solenoid valve driving control device of FIG. 6.

In the solenoid valve drive control device 60 of this Embodiment, as for step S1-step S8 similar to the flow chart shown in FIG. 3 of the solenoid valve drive control device 60 of the above-mentioned Embodiment, as it is similar, the detail explanation is omitted.

In the solenoid valve drive control device 60 of this Embodiment, in the hold mode, a dropout sensing device that detects the dropout in which the plunger 46 is separated from the state of adsorption to the attracting member 34 is provided.

That is, in the solenoid valve drive control device 60 of the invention, as mentioned above, an extra electric current is not flowed in the electromagnetic coil 18 of the solenoid 66.

As a result, for instance, it might drop from the state that the plunger 46 is attached to the attracting member 34 by the cause of the change of some vibrations and pressures etc. (external cause).

It might not be able to attach again when entering the state of the dropout like this.

As a result, in the hold mode, when the plunger 46 is dropped by any chance, the dropout, in which the plunger 46 is separated from the state of adsorption to the attracting member 34, is detected by the dropout sensing device.

Consequently, again application of the electric current to the solenoid 66 is started, so that the dropout, in which the plunger 46 is separated from the state of adsorption to the attracting member 34, can be avoided.

As a result, operation and the reliability is improved.

Specifically, as shown in FIG. 6, between step S6 and step S7, it is judged whether the plunger 46 is dropped from the attracting member 34 in step S9 or not, that is, whether the dropout of the plunger 46 is detected or not.

In addition, in step S9, when judged that plunger 46 is dropped from the attracting member 34, it returns to step S2.

The timer measurement of the electric current application time is started in step S2, and in step S3, application of the electric current to the coil is started.

On the other hand, in step S9 when it is judged that plunger 46 is not dropped from the attracting member 34, in step S7, it is judged whether it is a zero cross of the monophase current power supply at the power supply period.

In this case, as shown in FIG. 7, in the dropout sensing device, the current value when application of the electric current to the solenoid is started at the zero cross timing is measured by the electric current sensing device 78.

As a result, whether it is the predetermined dropout detection current value Id or less is judged and the dropout is detected.

Like this, the current value when application of the electric current to the solenoid is started at the zero cross timing is measured by the electric current sensing device 78, so that whether it is the predetermined dropout detection current value Id or less may be judged and the dropout may be detected (see B portion of FIG. 7).

That is, in the state that the plunger 46 is attached to the attracting member 34, the coil inductance is, for instance, 2.5 H or more.

On the other hand, in the state that the plunger 46 is dropped, the coil inductance is, for instance, 1.5H or less.

Therefore, the current value when application of the electric current to the solenoid 66 is started at the zero cross timing is, in the state that the plunger 46 is attached to the attracting member 34 (i.e. high inductance), for instance, 21 mA is exceeded.

On the contrary, in the low inductance in the state that the plunger is dropped (in FIG. 7, excluding solid line of 2.5H), the electric connection begins from 21 mA or less.

Therefore, this as indication (predetermined dropout detection current value Id), the current value when application of the electric current to the solenoid 66 is started at the zero cross timing is measured by the electric current sensing device 78.

Consequently, whether it is the predetermined dropout detection current value Id or less may be judged and the dropout may be detected (see B portion of FIG. 7).

As a result, the dropout, in which the plunger 46 is separated from the state of adsorption to the attracting member 34 by the dropout sensing device, is detected.

Furthermore, application of the electric current to the solenoid 66 is started again, so that the dropout in which the plunger 46 is separated from the state of adsorption to the attracting member 34 can be avoided, and operation and the reliability are improved.

Moreover, the dropout sensing device may be included that, the time, from the time when application of the electric current to the solenoid 66 is started at the zero cross timing, to the time when the current value, which flows in the solenoid 66 detected by the electric current sensing device 78, is reached to the predetermined setting current value Ia, is measured, and whether it is the predetermined dropout detection time is judged and the dropout is detected (for instance, in FIG. 7, t3 for 1.3H is measured and judged).

Moreover, as shown in FIG. 7, in the state that the plunger 46 is attached to the attracting member 34, the coil inductance is, for instance, 2.5 H or more.

On the other hand, in the state that the plunger 46 is dropped, the coil inductance is, for instance, 1.5 H or less.

Therefore, the current value when application of the electric current to solenoid 66 begins at the zero cross timing will exceed 21 mA for instance in the state that the plunger attaches to the attracting member (high inductance, for instance, in case of 2.5H in FIG. 7).

On the contrary, the electric connection will begin from 21 mA or less in the state that plunger 46 drops (i.e. in case of 1.3 H in the low inductance, for instance, FIG. 7).

Moreover, as described above, in the interruption mode, at the time when the current value, which flows in the solenoid 66 detected by the electric current sensing device 78 is reached to the predetermined setting current value Ia, the application of the electric current to the solenoid 66 is interrupted by the switching device 68.

Therefore, as shown in FIG. 7, time t2 is a time, which required from the time when application of the electric current is interrupted from the state that the plunger 46 is attached to the attracting member 34 (i.e. high inductance, for instance, in case of 2.5H in FIG. 7), to the time to the setting current value Ia.

In addition, time t1 is a time, which required from the time when application of the electric current is interrupted from the state that the plunger is dropped (i.e. low inductance, for instance, in case of 1.3H in FIG. 7). to the setting current value Ia.

Between the time t2 and the time t1, by the influence of the electromagnetic coil at charge time, in the state that the plunger 46 is dropped (i.e. low inductance), the electric current application time required for this charge is shortened compared with the state that the plunger 46 is attached to the attracting member 34 (i.e. high inductance).

As shown in FIG. 7, by measuring this time difference (t2–t1), whether dropping of plunger 46 is occurred or not can be determined.

That is, the time, from the time when application of the electric current to the solenoid 66 is started at the zero cross timing, to the time when the current value, which flows in the solenoid 66 detected by the electric current sensing device 78 is reached to the predetermined setting current value Ia, is measured.

Consequently, whether it is the predetermined dropout detection time or less may be judged and the dropout may be detected.

As a result, the dropout, in which the plunger 46 is separated from the state of adsorption to the attracting member 34, is detected by the dropout sensing device.

Consequently, again application of the electric current to the solenoid 66 is started, so that the dropout, in which the plunger 46 is separated from the state of adsorption to the attracting member 34, can be avoided.

As a result, operation and the reliability is improved.

In this case, since there is a power-supply voltage dependency for charge time, the determination value at the electric connection time should be changed by the power-supply voltage.

That is, charge time changes depending on the coil and the power-supply voltage.

Time shortens when the power-supply voltage is large. For instance, for this purpose, by judging whether it is a voltage that is higher than 110V or low voltages, it should detect whether the time during which the electric current is applied to solenoid 66 is short or long.

That is, it is necessary to shorten the determination time in a high power-supply voltage to compare this.

Therefore, for instance, it may be controlled like the flow chart shown in FIG. 8.

That is, the determination is started in step S11. In addition, in step S12, whether the power-supply voltage is a smaller than the predetermined power-supply voltage V (for instance, 110V) is judged.

In addition, in step S12, in case that the power-supply voltage is judged to be a smaller than the predetermined power-supply voltage V (for instance, 110V), in step S13, whether the electric current application time is larger than the predetermined electric current application time T1 (for instance, 1.3 msec) is judged.

In addition, in step S13, incase that the electric current application time is larger than the predetermined electric current application time T1 (for instance, 1.3 msec) is judged, in step S14, as the plunger 46 is adsorption to attracting member 34, the absorption determination is performed.

On the other hand, in step S13, in case that the electric current application time is a smaller than the predetermined electric current application time T1 (for instance, 1.3 msec) is judged, in step S15, as the plunger 46 is dropped from the attracting member 34, the dropout determination is performed.

Moreover, in step S12, incase that the power-supply voltage is larger than the predetermined power-supply voltage V (for instance, 110V) is judged, in step S16, whether the electric current application time is larger than the predetermined electric current application time T2 (for instance, 0.8 msec) is judged.

In addition, in step S16, incase that the electric current application time is larger than the predetermined electric current application time T2 (for instance, 0.8 msec) is judged, n step S14, as the plunger 46 is adsorption to attracting member 34, the absorption determination is performed.

On the other hand, in step S16, in case that the electric current application time is a smaller than the predetermined electric current application time T2 (for instance, 0.8 msec) is judged, in step S15, as the plunger 46 is dropped from the attracting member 34, the dropout determination is performed.

In addition, as for these predetermined power-supply voltage V, the predetermined electric current application time T1, and the predetermined electric current application time T2, etc., they may be previously measured, and may be decided, and they may be made to the data base, and they may be memorized in the storage portion to be used.

Although preferable embodiment of the invention is described above, the invention is not limited to this embodiment.

In the above-mentioned Embodiment, the Embodiment that used the ac power supply is described as solenoid valve drive control device 60.

However, the solenoid valve drive control device 60 of the invention can be used in ac power supply and dc power supply (pulsating current).

In case of the dc power supply, the full-wave rectifier 64 may be omitted.

Moreover, the invention is characterized in that the charging current in the stray capacity of the coil is not generated.

Therefore, for instance, even if it is a dc power supply (for instance, rectangular wave and triangular wave) with the timing that crosses in the predetermined voltage of 0V-20V or less, it is available.

In addition, in the above-mentioned Embodiment, as for the solenoid 66, as an electric current return current member that returns to solenoid 66 when application of the electric current is interrupted, the flywheel diode is used.

However, the RC snubber circuit etc. can be used for instance as an electric current return current member.

Therefore, various changes are possible in the scope in which it does not deviate from the object of the invention.

In the invention, if the degradation of power-factor is allowed, the solenoid valve that has the shading off coil (shading off ring) is available.

INDUSTRIAL APPLICABILITY

The invention relates to a solenoid valve drive control device.

In more detail, the invention may be applicable to a solenoid valve drive control device and a solenoid valve comprising the solenoid valve drive control device, in which the alternating current from the ac power supply is converted into direct current by using the full-wave rectification, and a plunger is moved by applying the electric current this direct current to a solenoid (electromagnetic coil), a valve element installed in the plunger is moved, and attached to and separated from a valve seat, and a valve port formed to the valve seat is opened and closed.

EXPLANATION OF LETTERS OR NUMERALS

10
Solenoid valve
12
Valve element
14
Control unit
16
Driving portion
18
Electromagnetic coil
22
Molding resin
24

26 Magnetic frame
28 Base plate portion
30 Driving portion inserting through hole
32 Bobbin
34 Driving portion inserting through hole
36 Attracting member
38 Bolt inserting through hole
40 Upper plate portion
42 Bolt inserting through hole
44 Fastening bolt
46 Plunger casing
48 Plunger
50 Valve seat
52 Energisation spring
60 Valve port
62 Solenoid valve driving control device
64 Alternator
66 Full-wave rectifier
68 Solenoid
72 Switching device
74 Zero cross timing generation device
76 Zero cross detector
78 Timing generator circuit
80 Electric current sensing device
82 Current detection resistance
100 Electric current limit comparator circuit
102 Solenoid valve
104 Valve element
106 Control unit
108 Driving portion
112 Electromagnetic coil
114 Molding resin
116 Magnetic frame
118 Base plate portion
120 Driving portion inserting through hole
122 Bobbin
124 Driving portion inserting through hole
126 Attracting member
128 Bolt inserting through hole
130 Upper plate portion
132 Bolt inserting through hole
134 Fastening bolt
136 Plunger casing
138 Plunger
140 Valve seat
142 Energisation spring
144 Valve port
146 Lower end surface
148 Groove for coil installation
200 Coil
202 Solenoid valve driving control device
204 Full-wave rectifier portion
206 Power supply smooth portion
208 Electromagnetic coil
210 Comparison operation portion
212 Driver element portion
214 Adsorption electric current instruction portion
300 Adsorption holding current instruction portion
302 Solenoid valve controller
304 Valve coil
306 Positive characteristic temperature coefficient element
308 Relay
310 Control unit
312 Power unit for inverter
D1 Power unit for control
Ia Diode
Ib Setting current value Holding current value
Ic
Circuit protection current value
ID
Dropout detection current value
Q1
Transistor
R1
Resistance
t
Dropout detection time
t1
Time
T1
electric current application time
t2
Time
T2
electric current application time
V
Power-supply voltage

DOCUMENT TITLE

Drawing

Figure 10:
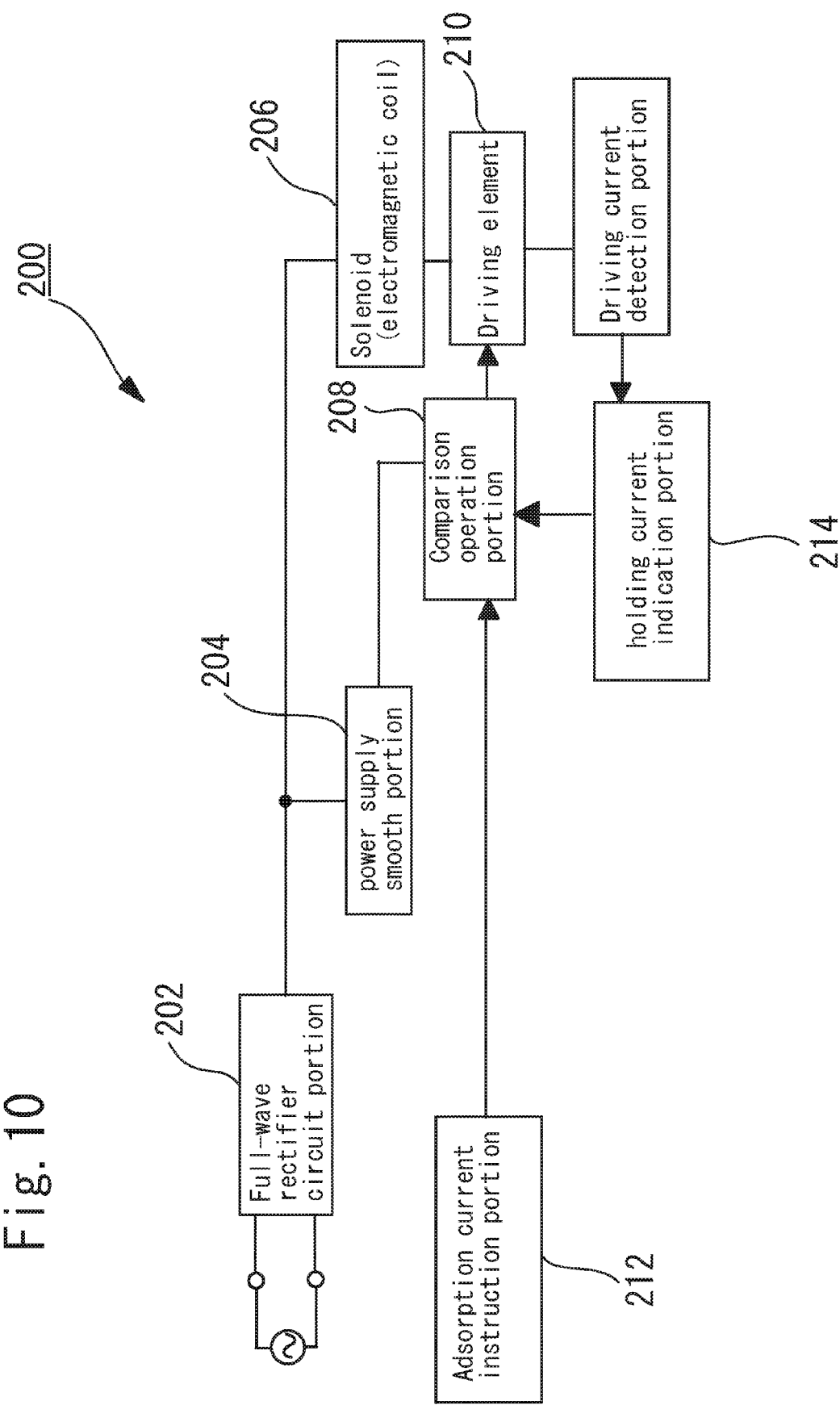
FIG. 10 is a block diagram of conventional solenoid valve driving control device 200.

[FIG. 1]
[FIG. 2]
[FIG. 3]
[FIG. 4]
[FIG. 5]
[FIG. 6]
[FIG. 7]
[FIG. 8]
[FIG. 9]
[FIG. 10]
[FIG. 11]

The invention claimed is:

1. A solenoid valve drive control device in which a plunger is moved by applying an electric current to a solenoid, a valve element installed in the plunger is moved, and contacted to and separated from a valve seat, and the valve element enters into a state of an open valve by separating the valve element from the valve seat and attaching the valve element to an attracting member when the electric current is applied to the solenoid, and the valve element abuts the valve seat and enters into a state of a closed valve when application of the electric current to the solenoid is interrupted, the solenoid valve drive control device comprising:
  a switching device that provides and interrupts the application of the electric current to the solenoid;
  a zero cross timing generation device that controls the application of the electric current to the solenoid by the switching device so that the application of the electric current to the solenoid is started at a first zero cross timing in a power supply period; and
  an electric current sensing device that detects a value of an electric current that flows to the solenoid,
  wherein the solenoid valve drive control device has
  an interruption mode in which the application of the electric current to the solenoid is interrupted by the switching device when the value of the electric current that flows to the solenoid detected by the electric current sensing device reaches a predetermined first setting electric current value Ia by control of the zero cross timing generation device, after the application of the electric current to the solenoid is started by the switching device at the first zero cross timing, and
  a hold mode in which a holding power is generated by discharging energy accumulated in the solenoid through a snubber circuit until a second zero cross timing subsequent to the first zero cross timing after the application of the electric current to the solenoid is interrupted by the switching device, and the value of the electric current that flows to the solenoid is set to reach a predetermined holding electric current value Ib or more.

2. The solenoid valve drive control device as defined in claim 1, wherein the predetermined first setting electric current value is an electric current value when the plunger is attached to the attracting member after the application of the electric current to the solenoid is started at the first zero cross timing.

3. The solenoid valve drive control device as defined in claim 1, wherein the predetermined holding electric current value is an electric current value when a state that the plunger is attached to the attracting member can be held.

4. The solenoid valve drive control device as defined in claim 1, further comprising: a dropout sensing device that detects dropout in which a state of the plunger is changed from a state of attachment to the attracting member in the hold mode.

5. The solenoid valve drive control device as defined in claim 4, wherein
  the dropout sensing device measures the value of the electric current when the application of the electric current to the solenoid is started at the first zero cross timing by an electric current sensing device, and determines whether the value of the electric current is a predetermined dropout detection electric current value or less, and detects the dropout.

6. The solenoid valve drive control device as defined in claim 4, wherein
  the dropout sensing device measures a period from a time when the application of the electric current to the solenoid is started at the first zero cross timing to a time when the value of the electric current, which flows in the solenoid, detected by the electric current sensing device, reaches the predetermined first setting electric current value Ia, and determines whether the measured period is a predetermined period for detecting the dropout and detects the dropout.

7. The solenoid valve drive control device as defined in claim 1, further comprising:
  a circuit protection device that interrupts the application of the electric current to the solenoid by the switching device when the value of the electric current that flows to the solenoid detected by the electric current sensing device reaches a predetermined second setting electric current value Ic after an initial energization time at which the application of the electric current to the solenoid is started at the first zero cross timing for the first time.

8. A solenoid valve comprising a solenoid valve drive control device in which a plunger is moved by applying an electric current to a solenoid, a valve element installed in the plunger is moved, and contacted to and separated from a valve seat, and the valve element enters into a state of an open valve by separating the valve element from the valve seat and attaching the valve element to an attracting member when the electric current is applied to the solenoid, and the valve element abuts the valve seat and enters into a state of a closed valve when the application of the electric current to the solenoid is interrupted, the solenoid valve drive control device including:
- a switching device that provides and interrupts the application of the electric current to the solenoid;
- a zero cross timing generation device that controls the application of the electric current to the solenoid by the switching device so that the application of the electric current to the solenoid is started at first zero cross timing in a power supply period; and
- an electric current sensing device that detects a value of an electric current that flows to the solenoid,
- wherein the solenoid valve drive control device includes:
- an interruption mode in which the application of the electric current to the solenoid is interrupted by the switching device when the value of the electric current that flows to the solenoid detected by the electric current sensing device reaches a predetermined first setting electric current value Ia by control of the zero cross timing generation device, after the application of the electric current to the solenoid is started by the switching device at the first zero cross timing, and
- a hold mode in which a holding power is generated by discharging energy accumulated in the solenoid through a snubber circuit until second zero cross timing subsequent to the first zero cross timing after the application of the electric current to the solenoid is interrupted by the switching device, and the value of the electric current that flows to the solenoid is set to reach a predetermined holding electric current value Ib or more.

9. The solenoid valve as defined in claim 8, wherein the predetermined first setting electric current value is an electric current value when the plunger is attached to the attracting member after the application of electric current to the solenoid is started at the first zero cross timing.

10. The solenoid valve as defined in claim 8, wherein the predetermined holding electric current value is an electric current value when a state that the plunger is attached to the attracting member can be held.

11. The solenoid valve as defined in claim 8, wherein the solenoid valve drive control device further includes a dropout sensing device that detects dropout in which a state of the plunger is changed from a state of attachment to the attracting member in the hold mode.

12. The solenoid valve as defined in claim 11, wherein the dropout sensing device measures the value of the electric current when the application of the electric current to the solenoid is started at the first zero cross timing by the electric current sensing device, and determines whether the value of the electric current is a predetermined dropout detection electric current value or less and detects the dropout.

13. The solenoid valve as defined in claim 11, wherein the dropout sensing device measures a period from a time when the application of the electric current to the solenoid is started at the first zero cross timing to a time when the value of the electric current, which flows in the solenoid, detected by the electric current sensing device, reaches the predetermined first setting electric current value Ia, and determines whether the measured period is a predetermined period for detecting the dropout and detects the dropout.

14. The solenoid valve as defined in claim 8, wherein the solenoid valve drive control device further includes a circuit protection device that interrupts the application of the electric current to the solenoid by the switching device when the value of the electric current that flows to the solenoid detected by the electric current sensing device reaches a predetermined second setting electric current value Ic after an initial energization time at which the application of the electric current to the solenoid is started at the first zero cross timing for the first time.

\* \* \* \* \*